United States Patent
Hong et al.

(10) Patent No.: US 6,583,915 B1
(45) Date of Patent: *Jun. 24, 2003

(54) DISPLAY DEVICE USING A MICRO LIGHT MODULATOR AND FABRICATING METHOD THEREOF

(75) Inventors: Hyung Ki Hong, Seoul (KR); Hyun Kyu Lee, Seoul (KR); Won Kyu Park, Kyounggi-do (KR); Yong Sung Ham, Kyounggi-do (KR); Je Hong Kim, Kyounggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 154 days.

This patent is subject to a terminal disclaimer.

(21) Appl. No.: 09/685,022

(22) Filed: Oct. 10, 2000

(30) Foreign Application Priority Data

| Oct. 8, 1999 | (KR) | 99-43551 |
| Oct. 8, 1999 | (KR) | 99-43554 |
| Dec. 30, 1999 | (KR) | 99-67558 |
| Dec. 31, 1999 | (KR) | 99-68055 |
| Dec. 31, 1999 | (KR) | 99-68068 |
| May 3, 2000 | (KR) | 2000-23800 |

(51) Int. Cl.$^7$ .................................................. G02F 1/00
(52) U.S. Cl. ....................... 359/237; 359/233; 359/254
(58) Field of Search .............................. 359/290, 237, 359/291, 295, 254, 308, 320, 233, 483; 385/901; 362/26, 31

(56) References Cited

U.S. PATENT DOCUMENTS 6,014,257 A * 1/2000 Furlani et al. .............. 359/573
6,195,196 B1 * 2/2001 Kimura et al. .............. 359/295
6,288,824 B1 * 9/2001 Kastalsky ................... 359/254

* cited by examiner

Primary Examiner—Hung Xuan Dang
Assistant Examiner—Tuyen Tra
(74) Attorney, Agent, or Firm—Birch, Stewart, Kolasch & Birch, LLP

(57) ABSTRACT

A display device using a micro light modulator that is capable of applying to various display apparatus. The display device has a plurality of fixed members installed parallel to each other over a substrate, the member being apart from each other; and a plurality of moveable members being driven with the fixed members by a statically electric force to switch a path of lights incident from the substrate.

36 Claims, 32 Drawing Sheets

LIGHT

LIGHT

DISPLAY DEVICE USING A MICRO LIGHT MODULATOR AND FABRICATING METHOD THEREOF

BACKGROUND OF THE INVENTION

1. Field of the Invention

This invention relates to a display device for switching light using a micro light modulator so as to display a picture, and to a method for fabricating the same.

2. Description of the Related Art

Recently, various flat panel display devices have been developed as next generation display devices. In a typical flat panel display device, there are liquid crystal display devices being already used in common and plasma display panels using a gas discharge, etc. The liquid crystal display device has a narrow visual angle and a slow responding speed. Also, the liquid crystal display device provides with a disadvantage that its fabricating process is complicated because of forming thin film transistors, which are used as switching elements, by a semiconductor fabricating process. On the other hand, the plasma display panel has a simple fabricating process and can provide a large screen. However, the plasma display panel has disadvantages in that its discharge and light emission are low in effective rate and its cost is high.

To solve the disadvantages of the flat panel display device as described above, a new display device has been developed. Recently, there has been proposed a transitive type of display device for displaying a picture using micro light modulators arranged in each picture element. Each micro light modulator is formed by using a micro electromechanical system (hereinafter, "MEMS") which is a micro-fine processing technique.

Referring to FIGS. 1 and 2, there is illustrated a micro light modulator including a plurality of ribbons 1 of stripe shape which are installed over a substrate 2. Each ribbon 1 has a function for reflecting or diffracting an incident light upon an electrical control. The ribbons 1 are divided into odd numbered ribbons 1A and even numbered ribbons 1B that they are arranged to alternate each other. The odd-numbered ribbons 1A are in parallel with the even-numbered ribbons during a non-display period without a control signal. Then, light incident to the ribbons is reflected at the surfaces of the ribbons 1 forming a plane. On the other hand, the odd-numbered ribbons 1A move perpendicularly toward the silicon substrate 2 by responding to the control signal, as shown in FIG. 3. Then, the incident light is refracted by an interference effect of light occurring between the odd-numbered ribbon 1A and the even-numbered ribbon 1B.

The display device using such a micro light modulator allows a high response speed. However, the display device can be applied to only a front projective display apparatus because of using the lights from the front side of a display face, as seen in FIGS. 1 and 2. Since the front projective display apparatus enlarges a picture displayed on the display device, the display device is fabricated in a small size and its picture elements become smaller. Due to this, the display device, which is applied to the front projective display apparatus, using the micro light modulator requires the pitch of the ribbons 1 and the distance between the ribbons 1 to be accurately set. Particularly, the display device is difficult to manufacture, because the odd-numbered ribbon 1A must be maintained a very short distance with the even-numbered ribbon 1B in order to perform a normal operation in the display and non-display modes. In other words, the distance between the odd-numbered ribbons 1A and the even-numbered ribbon 1B must become below 0.6 $\mu$m for normal operation. As described above, the display device using the micro light modulator make to be difficult a large screen because of having the accuracy and the difficult in the fabricating process.

SUMMARY OF THE INVENTION

Accordingly, it is an object of the present invention to provide a display device using a micro light modulator that is capable of applying to various display apparatus, and a fabricating method thereof.

A further object of the present invention is to provide a display device using a micro light modulator that is capable of enhancing response speed, and a fabricating method thereof.

Yet another object of the present invention is to provide a display device using a micro light modulator that is capable of being in a large screen, and a fabricating method thereof.

Still another object of the present invention is to provide a display device using a micro light modulator that is capable of having high light efficiency, and a fabricating method thereof.

In order to achieve this and other objects of the invention, a display device using a micro light modulator according to one aspect of the present invention includes; a plurality of fixed members installed parallel with each other over a substrate, the member being apart from each other; and a plurality of moveable members being driven with the fixed members by a statically electric force to switch a path of light incident from the substrate.

A display device fabricating method according to another aspect of the present invention includes the steps of: forming a conductive material on a substrate; forming fixed members by patterning the conductive material; forming a sacrificial layer on the entire surface of the substrate to cover the fixed members; disposing sequentially an elastic layer and the conductive material, the elastic layer having a highly elastic-restoring force; forming a moveable member by patterning the elastic layer and the conductive material on the sacrificial layer, the moveable member being overlapped with both edges of the fixed member; and removing the sacrificial layer.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 4:
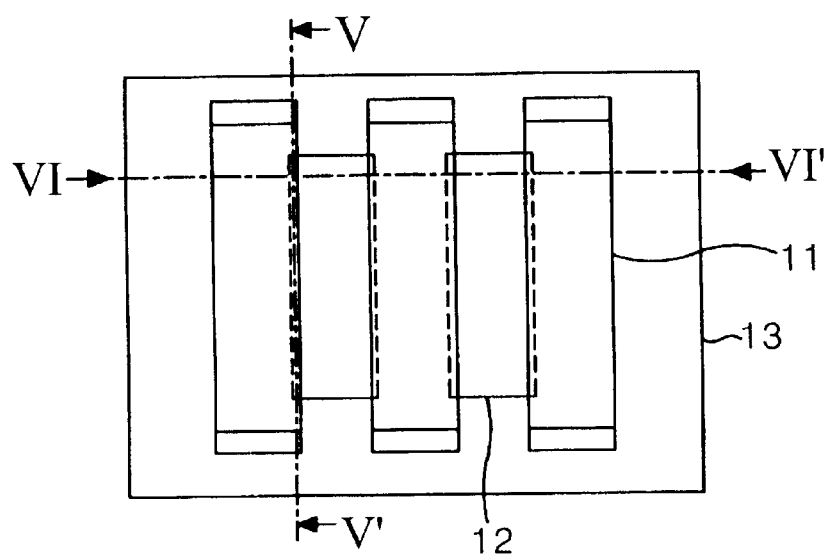
FIG. 4 is a planner view of showing a micro light modulator according to a first embodiment of the present invention.
Figure 5:
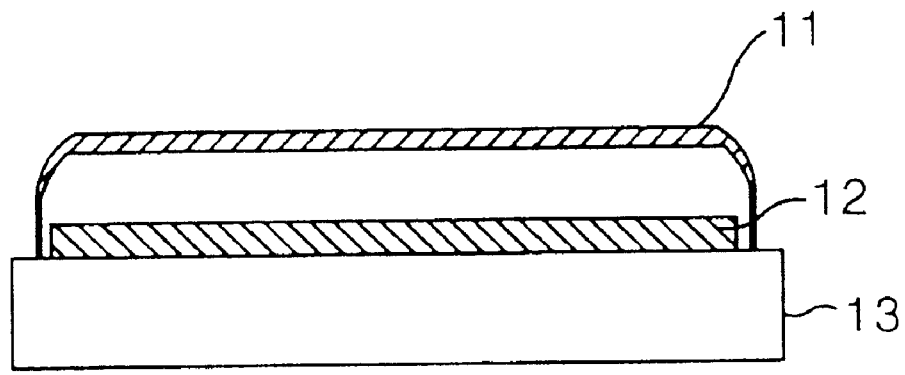
FIG. 5 is a sectional view of the micro light modulator cut along with a line A–A' in FIG. 4.
Figure 6:
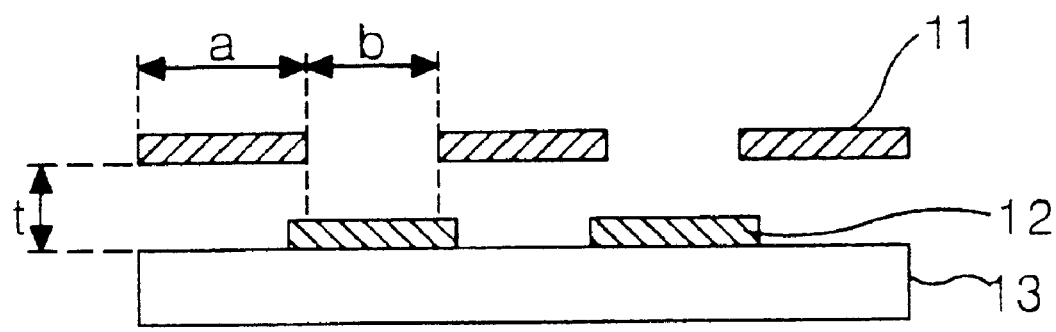
FIG. 6 is a sectional view of the micro light modulator cut along with a line B–B' in FIG. 4.

Referring to FIG. 4, there is shown a micro light modulator according to a first embodiment of the present invention. The micro light modulator of FIG. 4 includes a plurality of fixed members 12 formed parallel to each other on a substrate 13 to be at a predetermined distance from each other, and a plurality of moveable members 11 having both sides overlapped with the sides of the fixed members 12 and both end portion fixed on the substrate 13. The fixed members 12 are formed in a stripe shape and arranged to be at a predetermined distance from the moveable members 11 adjacent to it, as shown in FIGS. 5 and 6. The moveable members 11 each has both sides overlapped with the fixed members 12 adjacent to it, as shown in FIGS. 5 and 6. The moveable members 11 overlapped partially with the fixed members 12 each includes a central portion being coplanar and are positioned at a predetermined height from the substrate 13. Both end portions of each moveable member 11 are curved toward the substrate 13 and fixed on the substrate 13. The moveable members 11 and the fixed members 12 respond to a statically electric force which is selectively generated in accordance with a display and a non-display mode controlled by a electric signal, and switch a path of lights. The fixed members 12 are formed from a conductive material, a non-conductive material having an electrode therein or an opaque material of conductivity. The moveable member 11 is preferable to be formed from an opaque material being good in an elastic characteristic. To this end, each of the moveable members 11 and the fixed members 12 can be formed in a shape of multi-layers.

On the other hand, although the moveable members 11 and the fixed members 12 are formed to overlap to each other, they can be installed not to overlap to each other.

In the micro light modulator as shown in FIG. 6, if the moveable member 11 has a width of "a", a light transmissivity varies as a relationship of a distance "t" between the moveable member 11 and the fixed member 12 and a distance "b" between the moveable members 11, that is "t/b".

The liquid crystal display apparatus has about 6% light transmissivity. Accordingly, the micro light modulator must have above 6% light transmissivity in order to apply to the display device. Furthermore, the micro light modulator is preferably to have a light transmissivity of above 10% in order to provide high brightness.

FIGS. 7 to 15 represent the light transmissivity of the micro light modulator of the present invention which varied along with "t/b", when the moveable member 11 and the fixed member 12 do not overlap each other.

Figure 7:
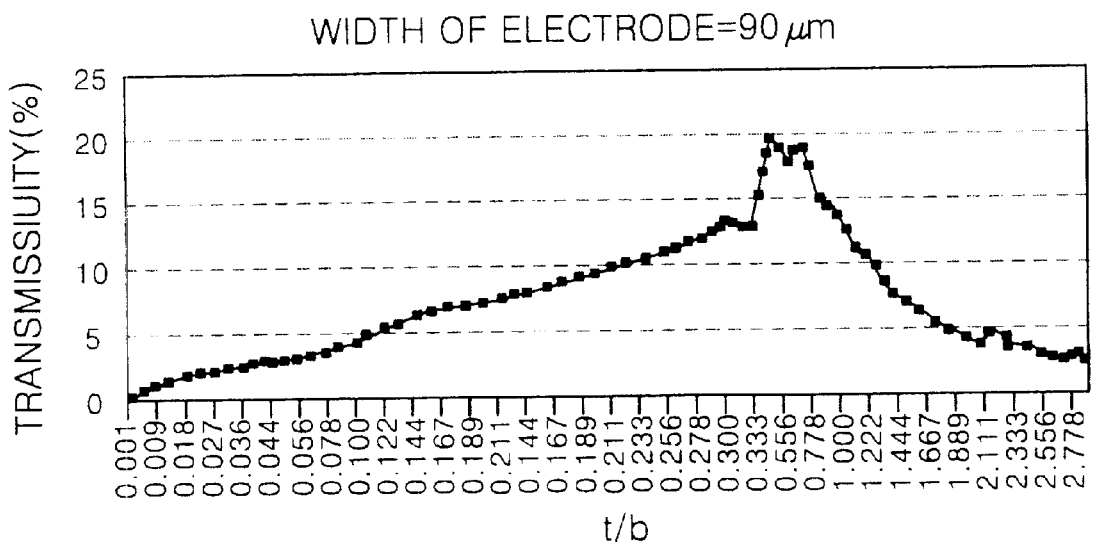
FIG. 7 is a graphic diagram of representing a light transmissivity of the micro light modulator in FIG. 4 in accordance with t/b when the moveable member is 90 μm in width without overlapping to the fixed member.

Referring to FIG. 7, the light transmissivity of the micro light modulator has a maximum value of about 20% when the moveable member 11 has a width of 90 μm. A light transmissivity of above 6% can be obtained when the value of "t/b" is in a range of from about 0.1 to 1.7. Also, the value of "t/b" must be in a range of about 0.2 to 1.4 in order to obtain a light transmissivity of 10%.

Figure 8:
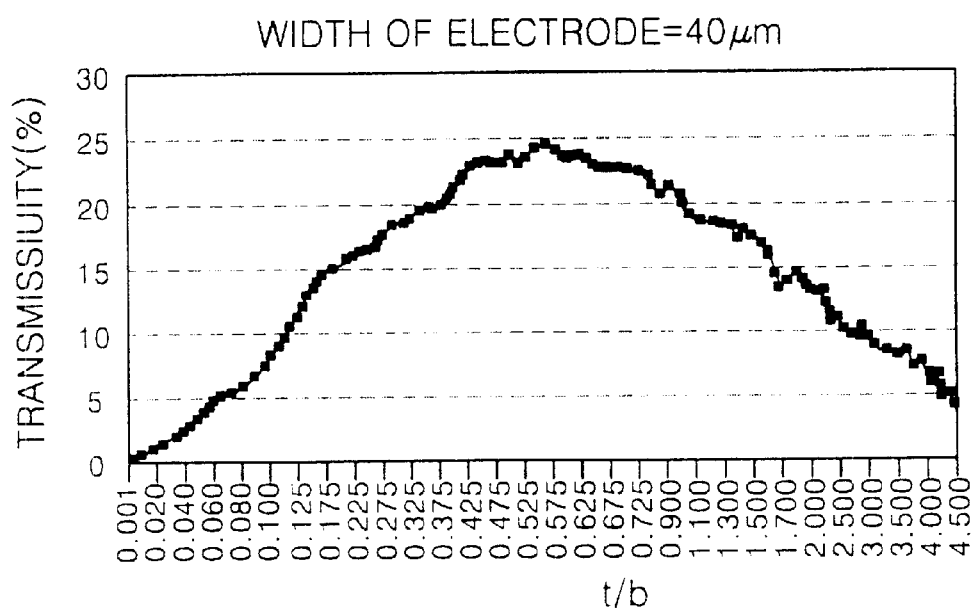
FIG. 8 is a graphic diagram of representing a light transmissivity of the micro light modulator in FIG. 4 in accordance with t/b when the moveable member is 40 μm in width without overlapping to the fixed member.

In FIG. 8, the light transmissivity of the micro light modulator is about 25% of the maximum value when the moveable member 11 has a width of 40 μm. A light transmissivity of above 6% can be obtained when the value of "t/b" is in a range of from about 0.09 to 4.5. Also, the value of "t/b" must be in a range of about 0.18 to 2.9 in order to obtain a light transmissivity of 10%.

Figure 9:
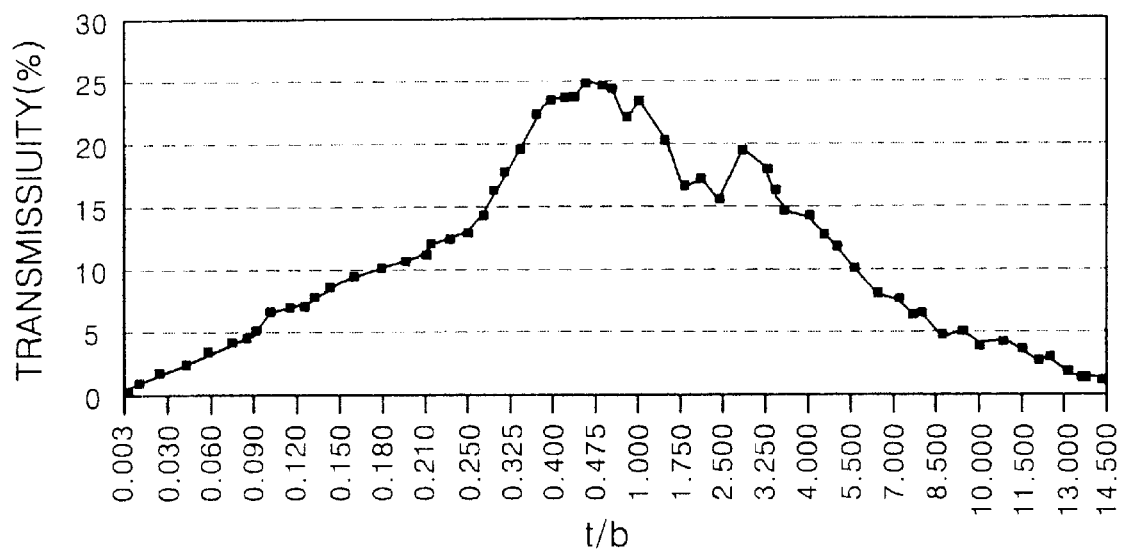
FIG. 9 is a graphic diagram of representing a light transmissivity of the micro light modulator in FIG. 4 in accordance with t/b when the moveable member is 20 μm in width without overlapping to the fixed member.

As seen in FIG. 9, the light transmissivity of the micro light modulator has a maximum value of about 25% when the moveable member 11 has a width of 20 μm. A light transmissivity of above 6% can be obtained when the value of "t/b" is in a range of from about 0.09 to 2.9. The value of "t/b" must be in a range of about 0.18 to 5.5 in order to obtain a light transmissivity of 10%.

Figure 10:
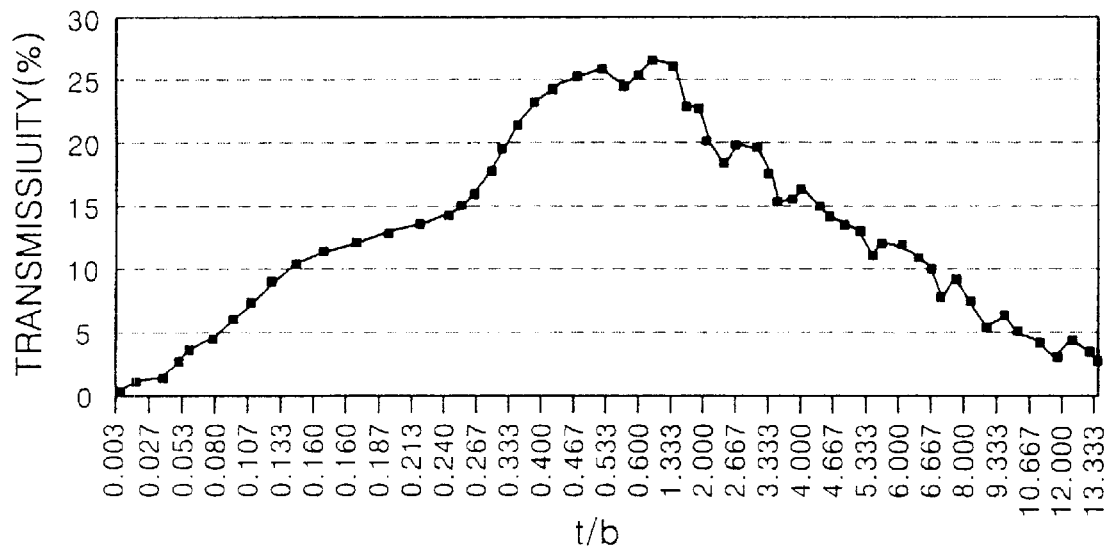
FIG. 10 is a graphic diagram of representing a light transmissivity of the micro light modulator in FIG. 4 in accordance with t/b when the moveable member is 15 μm in width without overlapping to the fixed member.

Referring to FIG. 10, the light transmissivity of the micro light modulator is about 27% of the maximum value when the moveable member 11 has a width of 15 μm. A light transmissivity of above 6% can be obtained when the value of "t/b" is in a range of from about 0.08 to 11.4. Also, the value of "t/b" must be in a range of about 0.11 to 7.3 in order to obtain light transmissivity of 10%.

Figure 11:
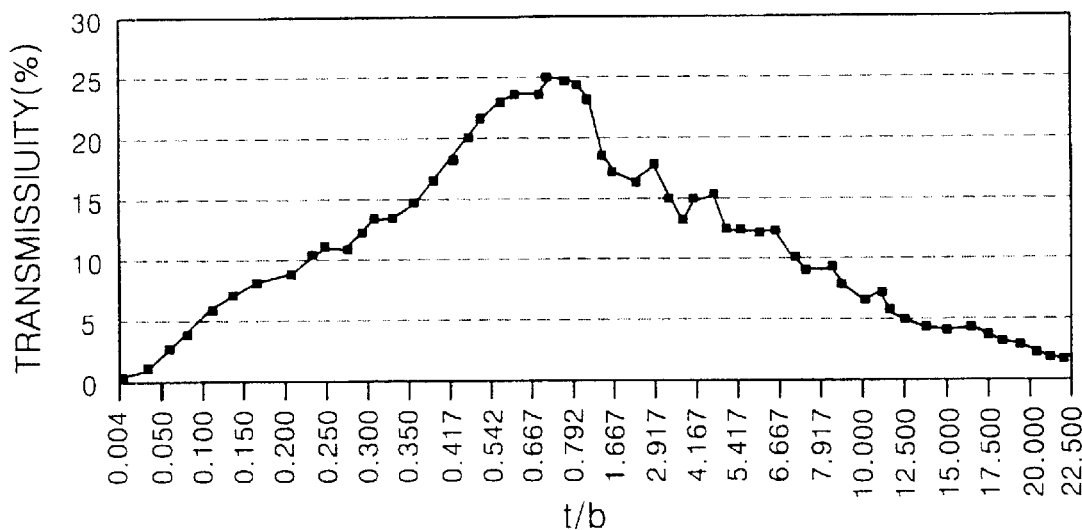
FIG. 11 is a graphic diagram of representing a light transmissivity of the micro light modulator in FIG. 4 in accordance with t/b when the moveable member is 12 μm in width without overlapping to the fixed member.

Referring to FIG. 11, the light transmissivity of the micro light modulator has a maximum value of about 30% when the moveable member 11 has a width of 12 μm. A light transmissivity of above 6% can be obtained when the value of "t/b" is in a range of from about 0.08 to 14.2. Also, the value of "t/b" must be in a range of about 0.17 to 10.0 in order to obtain a light transmissivity of 10%.

Figure 12:
FIG. 12 is a graphic diagram of representing a light transmissivity of the micro light modulator in FIG. 4 in accordance with t/b when the moveable member is 10 μm in width without overlapping to the fixed member.

In FIG. 12, the light transmissivity of the micro light modulator is about 30% of the maximum value when the moveable member 11 has a width of 10 μm. A light transmissivity of above 6% can be obtained when the value of "t/b" is in a range of from about 0.1 to 17.0. Also, the value of "t/b" must be in a range of about 0.18 to 14.0 in order to obtain a light transmissivity of 10%.

Figure 13:
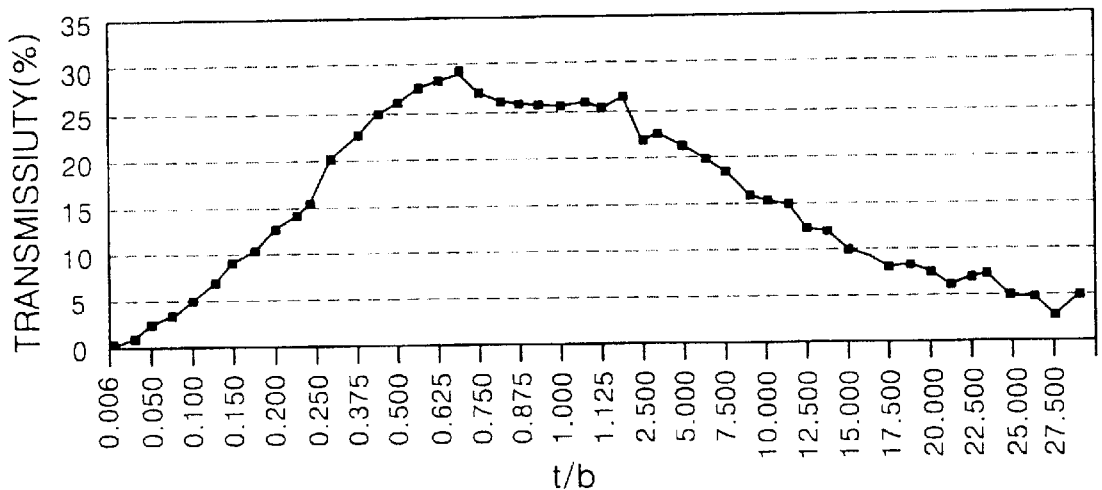
FIG. 13 is a graphic diagram of representing a light transmissivity of the micro light modulator in FIG. 4 in accordance with t/b when the moveable member is 8 μm in width without overlapping to the fixed member.

As seen in FIG. 13, the light transmissivity of the micro light modulator has a maximum value of about 30% when the moveable member 11 has a width of 8 μm. A light transmissivity of above 6% can be obtained when the value of "t/b" is in a range of from about 0.1 to 25.0. The value of "t/b" must be in a range of about 0.18 to 15.0 in order to obtain a light transmissivity of 10%.

Figure 14:
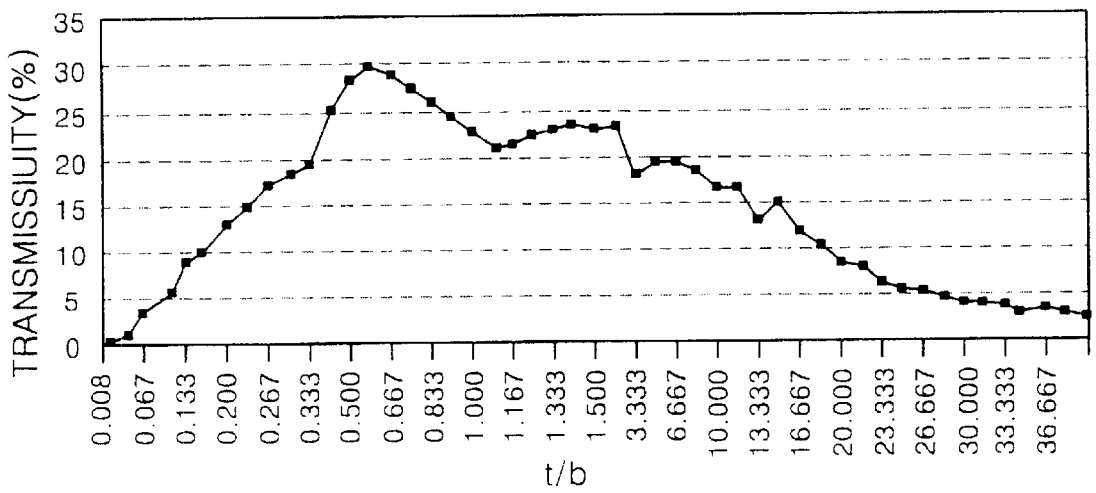
FIG. 14 is a graphic diagram of representing a light transmissivity of the micro light modulator in FIG. 4 in accordance with t/b when the moveable member is 6 μm in width without overlapping to the fixed member.

Referring to FIG. 14, the light transmissivity of the micro light modulator is about 30% of the maximum value when the moveable member 11 has a width of 6 μm. A light transmissivity of above 6% can be obtained when the value of "t/b" is in a range of from about 0.1 to 26.7. Also, the value of "t/b" must be in a range of about 0.18 to 20.0 in order to obtain a light transmissivity of 10%.

Figure 15:
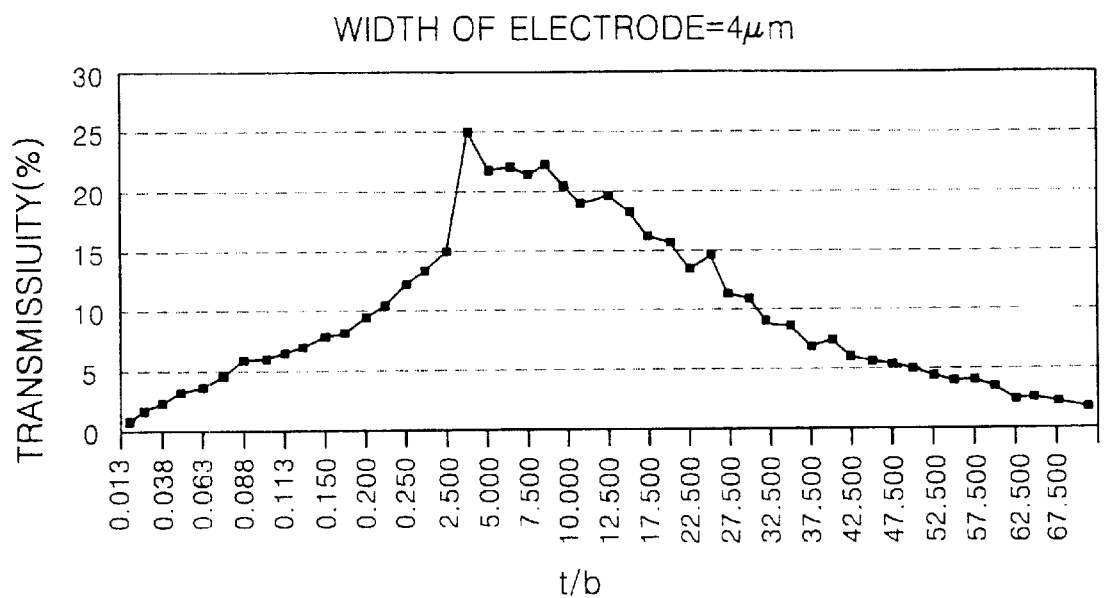
FIG. 15 is a graphic diagram of representing a light transmissivity of the micro light modulator in FIG. 4 in accordance with t/b when the moveable member is 4 μm in width without overlapping to the fixed member.

As shown in FIG. 15, the light transmissivity of the micro light modulator is about 25% of the maximum value when the moveable member 11 has a width of 4 μm. A light transmissivity of above 6% can be obtained when the value of "t/b" is in a range of from about 0.07 to 45.0. Also, the value of "t/b" must be in a range of about 0.15 to 30.0 in order to obtain a light transmissivity of 10%.

The variation of the light transmissivity of the micro light modulator as shown in FIGS. 7 to 15 can be explained by the following Table 1.

TABLE 1

| Width of Moveable Member (a) | t/b Transmissivity of Above 6% | Transmissivity Of above 10% |
|---|---|---|
| 90 μm | 0.1–1.7 | 0.2–1.4 |
| 40 μm | 0.09–4.5 | 0.18–2.9 |
| 20 μm | 0.09–8.0 | 0.18–5.5 |
| 15 μm | 0.08–11.4 | 0.15–7.3 |
| 12 μm | 0.08–14.2 | 0.17–10.0 |
| 10 μm | 0.1–17.0 | 0.18–14.0 |
| 8 μm | 0.1–25.0 | 0.18–15.0 |
| 6 μm | 0.1–26.7 | 0.18–20.0 |
| 4 μm | 0.07–45.0 | 0.15–30.0 |

As seen in Table 1, the range of "t/b" for obtaining a light transmissivity of 6% must be about 0.07 to 45.0 when the moveable member 11 having a width of 4 to 90 μm is not overlapped with the fixed member 12. Also, the range of "t/b" for obtaining a light transmissivity of 10% must be about 0.15 to 30.0 when the moveable member 11 having a width of 4 to 90 μm is not overlapped with the fixed member 12.

As described above, the value of "t/b" for obtaining a desired light transmissivity of the micro light modulator becomes larger, as the moveable member 11 becomes smaller in the width. Also, if the distance b between the moveable members 11 approaches the width of the moveable members 11, the distance t between the moveable member 11 and the fixed member 12 can be minimized. As a result, the moveable member 11 facilitates its manufacturing and driving, and prevents its degradation (or a cross talk of picture).

FIGS. 16 to 22 represent the light transmissivity of the micro light modulator of the present invention which varies with "t/b" and "a", when the moveable member 11 and the fixed member 12 are overlapped about 2 μm with each other.

Figure 16:
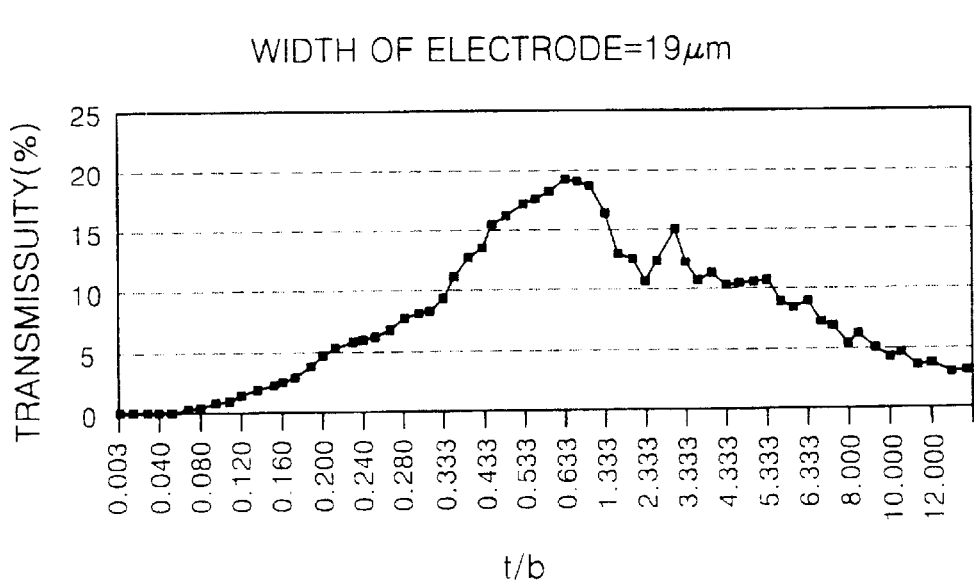
FIG. 16 is a graphic diagram of representing a light transmissivity of the micro light modulator in FIG. 4 in accordance with t/b when the moveable member is 19 μm in width and overlaps to the fixed member by about 2 μm.

Referring to FIG. 16, the light transmissivity of the micro light modulator has a maximum value of about 19% when the moveable member 11 has a width of 19 μm. A light transmissivity of above 6% can be obtained when the value of "t/b" is in a range of from about 0.2 to 8.0. Also, the value of "t/b" must be in a range of about 0.3 to 5.7 in order to obtain a light transmissivity of 10%.

Figure 17:
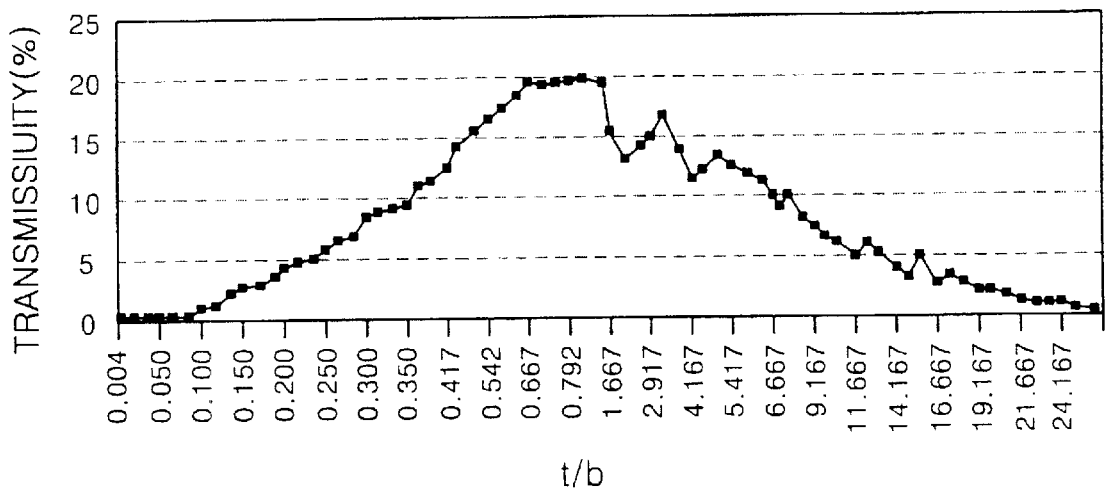
FIG. 17 is a graphic diagram of representing a light transmissivity of the micro light modulator in FIG. 4 in accordance with t/b when the moveable member is 16 μm in width and overlaps to the fixed member by about 2 μm.

In FIG. 17, the light transmissivity of the micro light modulator is about 20% of the maximum value when the moveable member 11 has a width of 16 μm. A light transmissivity of above 6% can be obtained when the value of "t/b" is in a range of about 0.2 to 13.4. Also, the value of "t/b" must be in a range of about 0.3 to 8.4 in order to obtain a light transmissivity of 10%.

Figure 18:
FIG. 18 is a graphic diagram of representing a light transmissivity of the micro light modulator in FIG. 4 in accordance with t/b when the moveable member is 14 μm in width and overlaps to the fixed member by about 2 μm.

As seen in FIG. 18, the light transmissivity of the micro light modulator has a maximum value of about 21% when the moveable member 11 has a width of 14 μm. A light transmissivity of above 6% can be obtained when the value of "t/b" is in a range of from about 0.2 to 14.9. The value of "t/b" must be in a range of about 0.3 to 9.0 in order to obtain a light transmissivity of 10%.

Figures 19, 20:
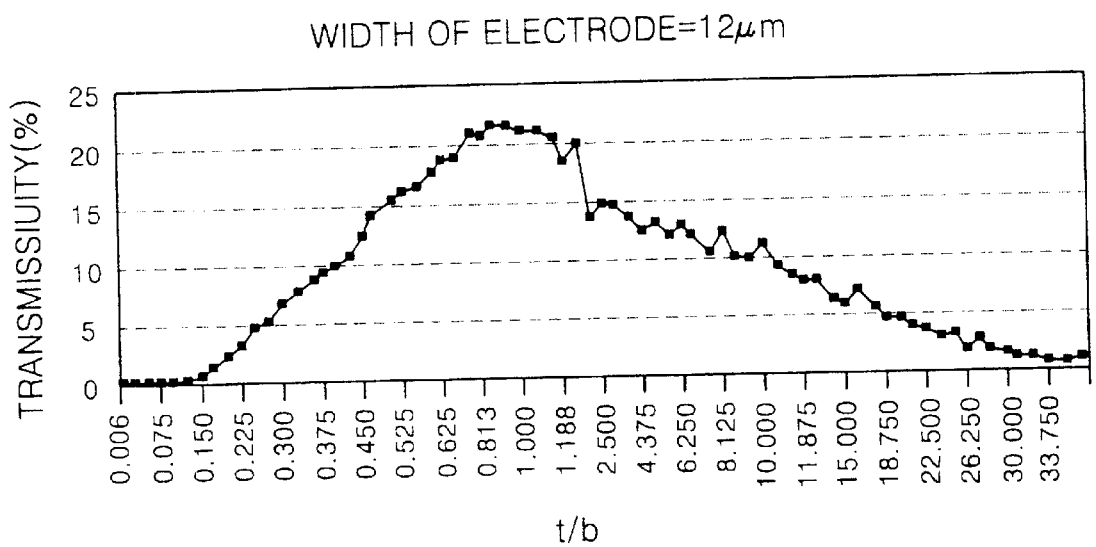
FIG. 19 is a graphic diagram of representing a light transmissivity of the micro light modulator in FIG. 4 in accordance with t/b when the moveable member is 12 μm in width and overlaps to the fixed member by about 2 μm.
FIG. 20 is a graphic diagram of representing a light transmissivity of the micro light modulator in FIG. 4 in accordance with t/b when the moveable member is 10 μm in width and overlaps to the fixed member by about 2 μm.

Referring to FIG. 19, the light transmissivity of the micro light modulator is about 21% of the maximum value when the moveable member 11 has a width of 12 μm. A light transmissivity of above 6% can be obtained when the value of "t/b" is in a range of from about 0.2 to 17.5. Also, the value of "t/b" must be in a range of about 0.4 to 10.7 in order to obtain a light transmissivity of 10%.

Referring to FIG. 20, the light transmissivity of the micro light modulator has a maximum value of about 15% when the moveable member 11 has a width of 10 μm. A light transmissivity of above 6% can be obtained when the value of "t/b" is in a range of from about 0.4 to 18.4. Also, the value of "t/b" must be in a range of about 0.5 to 9.2 in order to obtain a light transmissivity of 10%.

Figure 21:
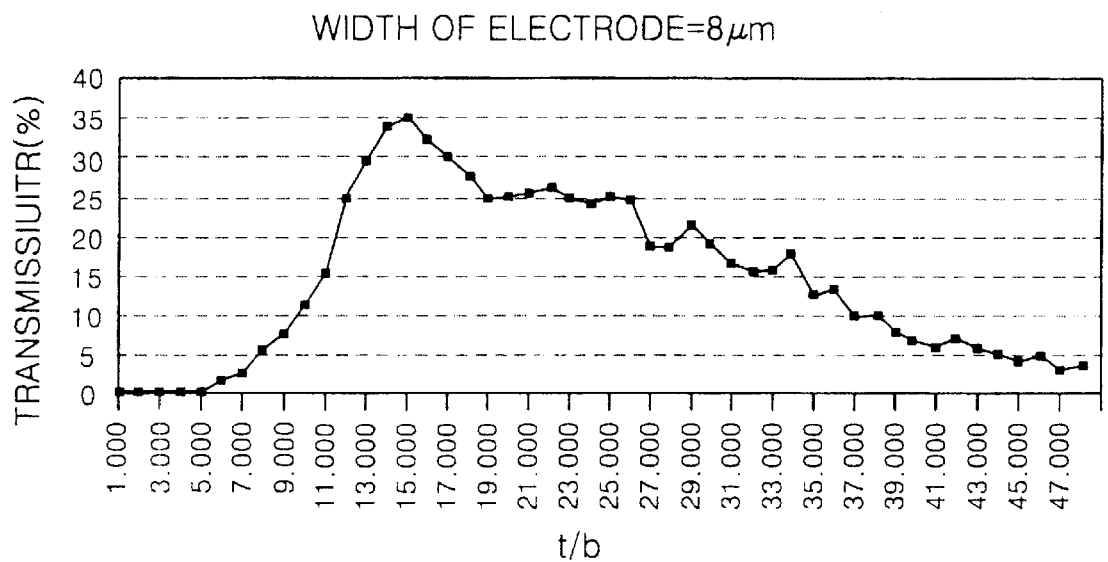
FIG. 21 is a graphic diagram of representing a light transmissivity of the micro light modulator in FIG. 4 in accordance with t/b when the moveable member is 8 μm in width and overlaps to the fixed member by about 2 μm.

In FIG. 21, the light transmissivity of the micro light modulator is about 14% of the maximum value when the moveable member 11 has a width of 8 μm. A light transmissivity of above 6% can be obtained when the value of "t/b" is in a range of from about 0.4 to 25.0. Also, the value of "t/b" must be in a range of about 0.5 to 5.0 in order to obtain a light transmissivity of 10%.

Figure 22:
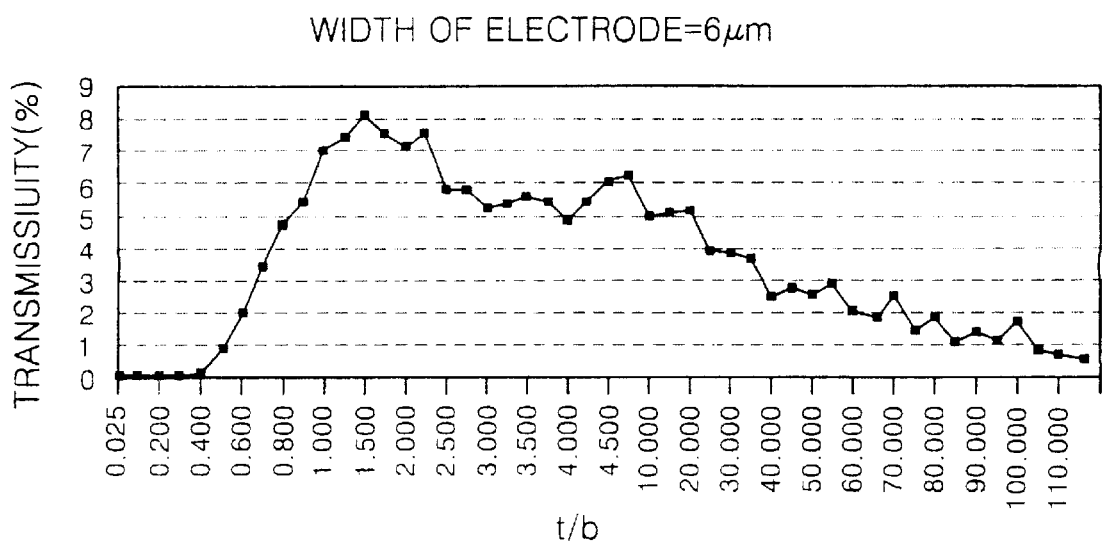
FIG. 22 is a graphic diagram of representing a light transmissivity of the micro light modulator in FIG. 4 in accordance with t/b when the moveable member is 6 μm in width and overlaps to the fixed member by about 2 μm.

As seen in FIG. 22, the light transmissivity of the micro light modulator has a maximum value of about 8% when the moveable member 11 has a width of 6 μm. A light transmissivity of above 6% can be obtained when the value of "t/b" is in a range of from about 0.9 to 10.0. However, a light transmissivity of above 10% cannot be obtained in any condition of "t/b".

The variation of the light transmissivity of the micro light modulator as shown in FIGS. 16 to 22 can be explained by the following Table 2.

TABLE 2

| Width of Moveable Member (a) | t/b Transmissivity of Above 6% | Transmissivity Of above 10% |
|---|---|---|
| 19 μm | 0.2–8.0 | 0.3–5.7 |
| 16 μm | 0.2–13.4 | 0.3–8.4 |
| 14 μm | 0.2–14.0 | 0.3–9.0 |
| 12 μm | 0.2–17.5 | 0.4–10.7 |
| 10 μm | 0.4–18.4 | 0.5–9.2 |
| 8 μm | 0.4–25.0 | 0.5–5.0 |
| 6 μm | 0.9–10.0 | — |

As seen in Table 2, the range of "t/b" for obtaining a light transmissivity of 6% is about 0.2 to 25.0 when the moveable member 11 having a width of 6 to 19 μm is overlapped about 2 μm with the fixed member 12. Also, the range of "t/b" for obtaining a light transmissivity of 10% is about 0.3 to 10.7 when the moveable member 11 having a width of 6 to 19 μm is overlapped about 2 μm with the fixed member 12.

As described above, the redundancy of "t/b" for obtaining a desired light transmissivity of the micro light modulator becomes larger as the moveable member 11 becomes smaller in the width. Also, the redundancy of "t/b" in which the moveable member 11 is overlapped about 2 μm with the fixed member 12 is smaller than that in which the moveable member 11 is not overlapped with the fixed member 12.

FIGS. 23A to 23F illustrates step by step a micro light modulator fabricating method according to first embodiment of the present invention.

Figure 23A:
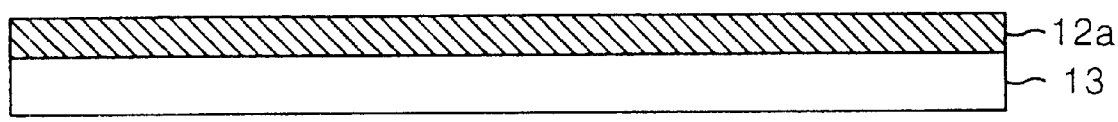
FIGS. 23A to 23F are sectional views of explaining step by step a method for fabricating the micro light modulator in FIG. 4.
Figure 23B:
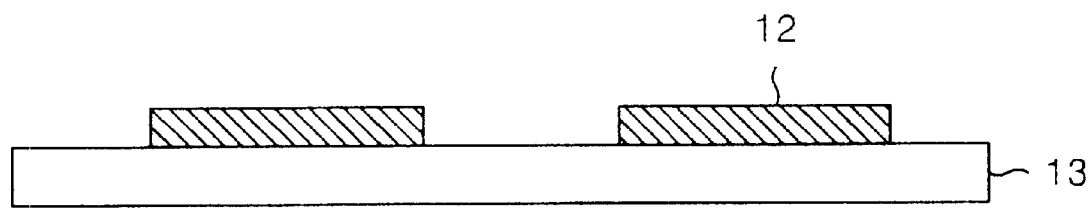
Figure 23C:
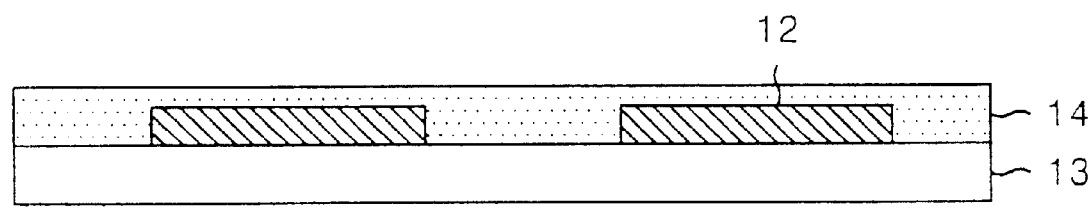
Figure 23D:
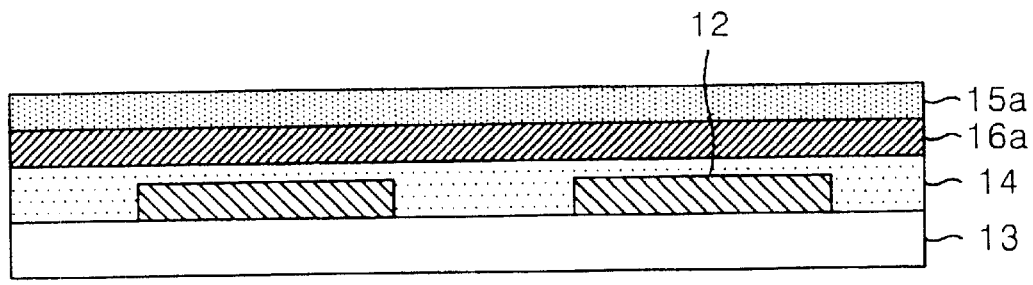
Figure 23E:
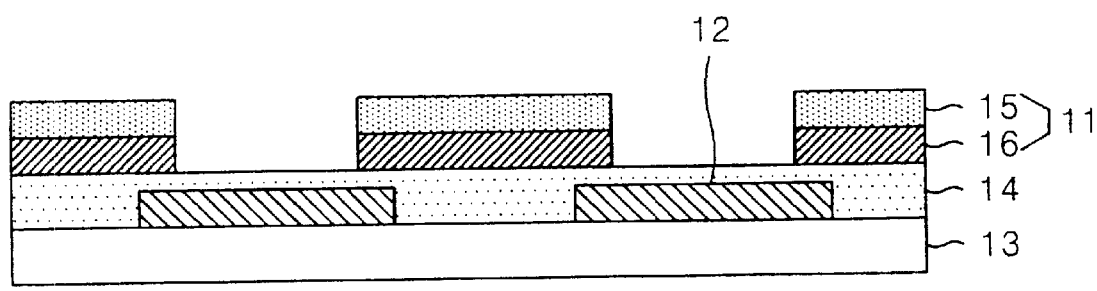
Figure 23F:
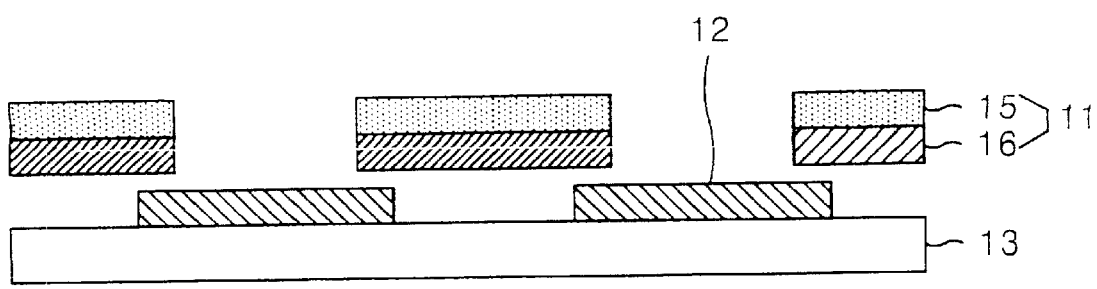

Referring to FIG. 23A, there is shown a silicon substrate 13 covered by an electrode material layer 12A thereon. The electrode material layer 12A is formed by depositing a conductive material or an opaque material having conductivity. On the other hand, the electrode material layer 12A can be formed from a non-conductive material having an electrode therein. A mask material (not shown) is formed on the electrode material layer 12. The mask material is patterned by being and developed. The patterned mask material exposes selectively the first electrode material layer 12A. The first electrode material layer exposed by the patterned mask material is etched to produce fixed members 12 as shown in FIG. 23B. Then, the patterned mask material is removed. On the fixed members 12 and the substrate 13, a sacrificial layer 14 is disposed to cover the fixed members 12, as shown in FIG. 23C. The sacrificial layer 14 can be formed from any one among $SiO_2$, a photoresist, a SOG (Spin on Glass), a polyimide, a PSG (Phospheor Silicate Glass), and a BPSG (Boro Phospheor Silicate Glass). In FIG. 23D, there are an elastic material layer 16A and a second electrode material layer 15A disposed on the sacrificial layer 14. The elastic material layer 16A is formed from a material having a good elastic characteristic, for example, SiNx. The elastic material layer 16A and the second electrode material layer 15A are simultaneously patterned through a photolithography process to provide a patterned elastic layer 16 and a patterned electrode layer 15, as shown in FIG. 23E. The patterned elastic layer 15 and the patterned electrode layer 15 are used for the moveable members 11 shown in FIGS. 4 to 6. The patterned elastic layer 16 functions to increase the elastic-restoring force of the patterned electrode layer 15. In other words, the patterned elastic layer 16 increases the elastic-restoring force of the moveable members 11. Finally, the sacrificial layer 14 is removed by dipping the substrate 13 in an etchent, as shown in FIG. 23F. The etchent includes a HF, and has further a BHF (Buffered Hydrofluoric Acid), a dilute HF and a stripper for the photoresist. The sacrificial layer 14 can be removed through a dry etching process. In this case, an etchent obtained from $C_2F_6$ source gas is used to the dry etching process.

On the other hand, the patterning of the elastic material layer and the second electrode material layer in FIG. 23E is simultaneously performed together with the removing of the sacrificial layer 14 in FIG. 23F, through once etching process. Also, a protective film for preventing a damage of the substrate 13 from the etchent can be formed on the substrate 13 prior to the etching process. If the substrate 13 is a glass substrate, the glass substrate is profitable for a panel having a large screen, but the substrate 13 can be damaged by over-etching. In view of this point, a silicon substrate not to be damaged by over-etching can be used for the substrate 13. However, the silicon substrate is placed at a disadvantaged position relative to the glass substrate, for the panel having the large screen.

FIGS. 24A to 24F shows step by step a method for fabricating the micro light modulator of FIG. 4 according to first embodiment of the present invention.

Figure 24A:
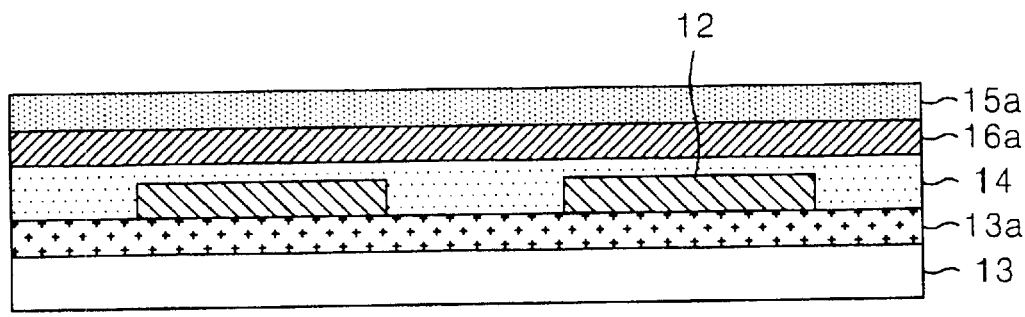
FIGS. 24A to 24F are sectional views of explaining step by step another method for fabricating the micro light modulator in FIG. 4.
Figure 24B:
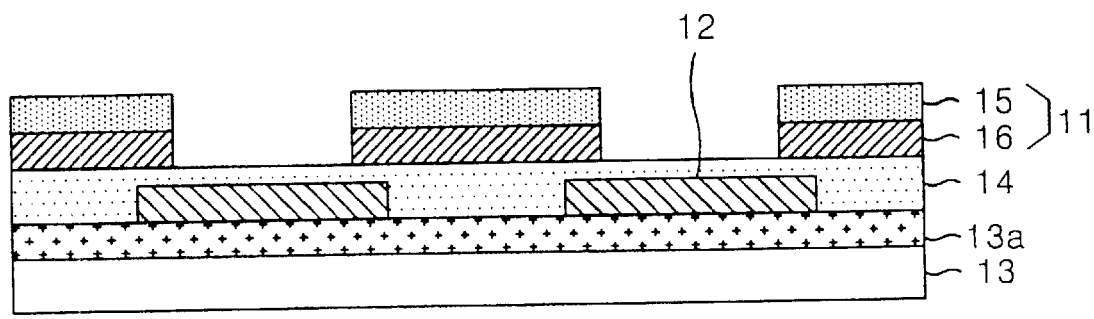
Figure 24C:
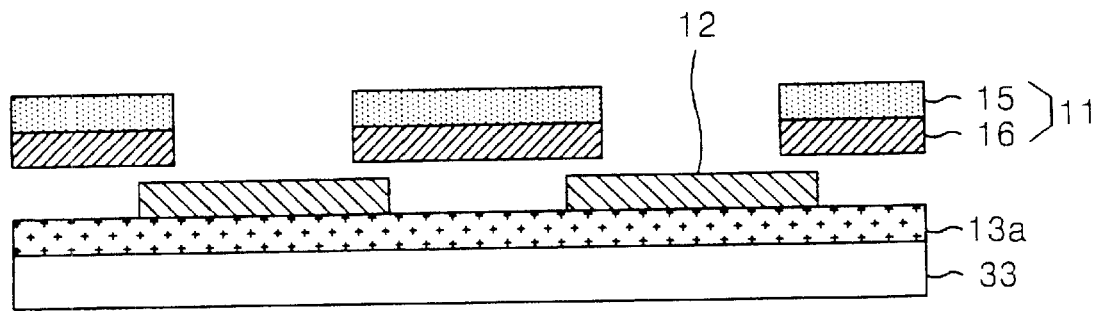
Figure 24D:
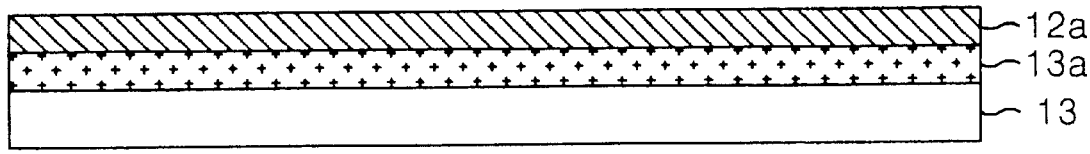
Figure 24E:
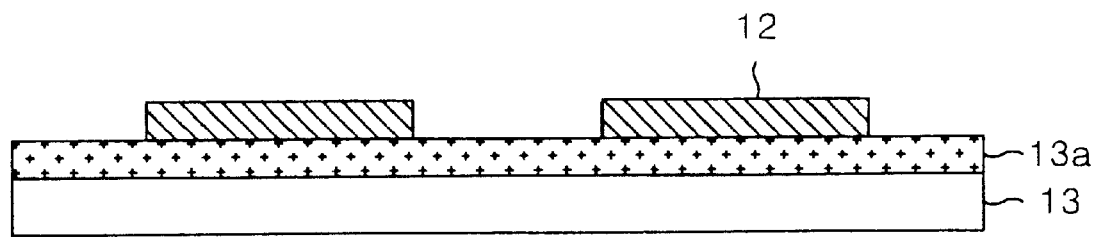
Figure 24F:
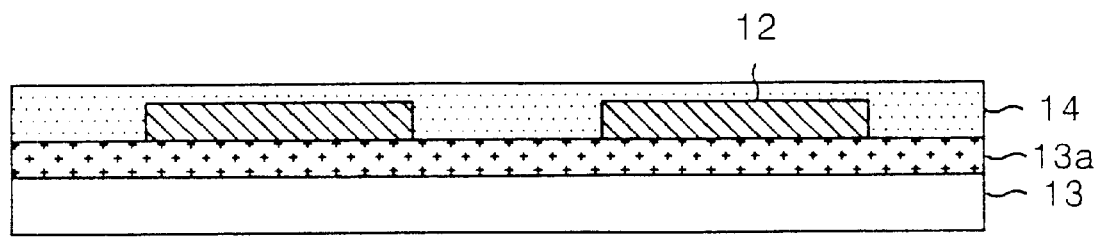

Referring to FIG. 24A, there is shown a substrate 13 covered with a protective film 13A. The substrate 13 is a glass substrate which is profitable for a panel having a large screen. The protective film 13A functions to protect the substrate 13 from an etchent. To this end, the protective film 13A can be formed from an light hardening resin such as an acrylate resin, an urethane resin and so on. Also, the protective film 13A can be made from any material, such as SiNx, capable of protecting the substrate 13 from the etchent. A first electrode material layer 12A is disposed on the protective film 13A through a depositing process. A mask material (not shown) is formed on the electrode material layer 12A. The mask material is patterned by being exposed and developed. The patterned mask material exposes selectively the first electrode material layer 12A. The first electrode material layer exposed by the patterned mask material is etched to produce fixed members 12 as shown in FIG. 24B. Then, the patterned mask material is removed. On the fixed members 12 and the protective film 13A, a sacrificial layer 14 is disposed to cover the fixed members 12, as shown in FIG. 24C. The sacrificial layer 14 can be formed from any one among $SiO_2$, a photoresist, a SOG, a polyimide, a PSG and a BPSG. In FIG. 24D, there are sequentially disposed an elastic material layer 16A such as SiNx and a second electrode material layer 15A on the sacrificial layer 14. The elastic material layer 16A and the second electrode material layer 15A are simultaneously patterned through a photolithography process to provide a patterned elastic layer 16 and a patterned electrode layer 15, as shown in FIG. 24E. The patterned elastic layer 15 and the patterned electrode layer 15 are used for the moveable members 11 shown in FIG. 4. Finally, the sacrificial layer 14 is removed by dipping the substrate 13 in an etchent, as shown in FIG. 24F. Then, the protective film 13A protects the substrate 13 from the etchent. The etchent includes a HF, and has further a BHF (Buffered Hydrofluoric Acid), a dilute HF and a stripper for the photoresist. The sacrificial layer 14 can be removed through a dry etching process. In this case, an etchent obtained from $C_2F_6$ source gas is used to the dry etching process.

Figure 25:
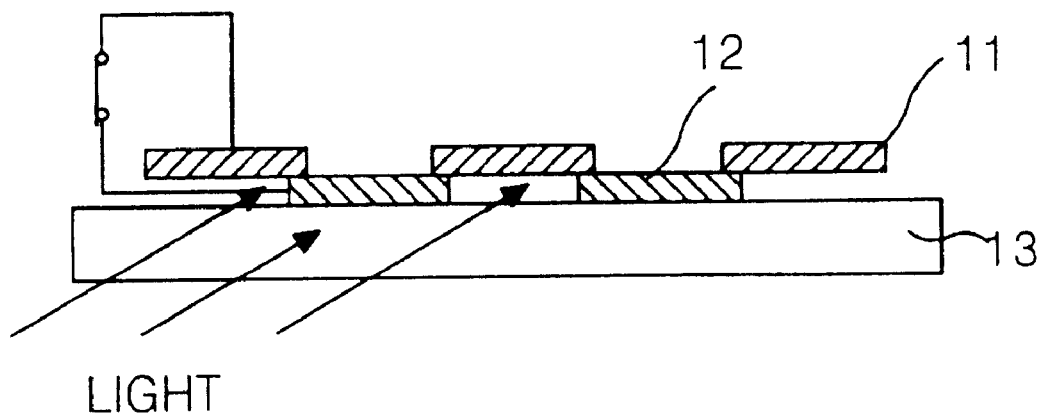
FIG. 25 is a sectional view of showing the micro light modulator of FIG. 4 in a non-display mode.
Figure 26:
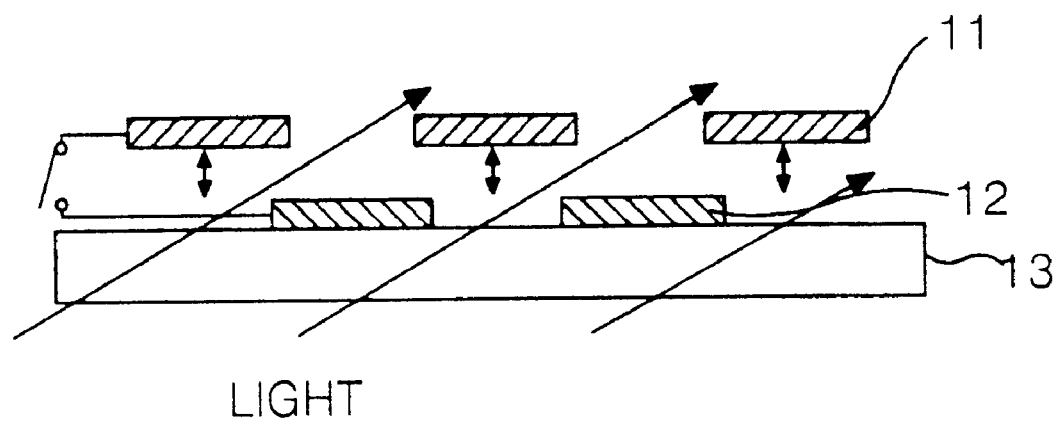
FIG. 26 is a sectional view of showing the micro light modulator of FIG. 4 in a display mode.

FIGS. 25 and 26 illustrate a driven state of the micro light modulator according to the first embodiment of present invention in the non-display and display modes, respectively.

Referring to FIGS. 25 and 26, lights are incident to the rear surface of the substrate 13. In other words, the micro light modulator uses a light source of a back light system as a transmissive liquid crystal display apparatus.

In the non-display mode, a predetermined level of voltage is applied to the moveable members 11 and the fixed members 12, as shown in FIG. 25. A static electric force in the attraction is generated between the moveable member 11 and the fixed members 12. Accordingly, Each moveable member 11 contacts with the fixed members 12 adjacent it, by an absorption force. Then, the moveable members 11 and the fixed members 12 cut off the lights from the rear surface of the substrate 13.

On the other hand, the voltage is not applied to the moveable members 11 and the fixed members 12 in the display mode, as shown in FIG. 26. Each moveable member 11 moves upwardly from the substrate 13 and the fixed member 12 by its elastic force and comes back to an original position. Then, a light path is provided between the moveable member 11 and the fixed member 12. The lights from the rear surface of the substrate 13 progress toward a display surface through the light path to display a picture on the display surface.

As described above, the micro light modulator according to the first embodiment of the present invention is driven in normally white, because the picture is displayed when an electric field is not applied between the moveable members 11 and the fixed members 12.

Figure 27:
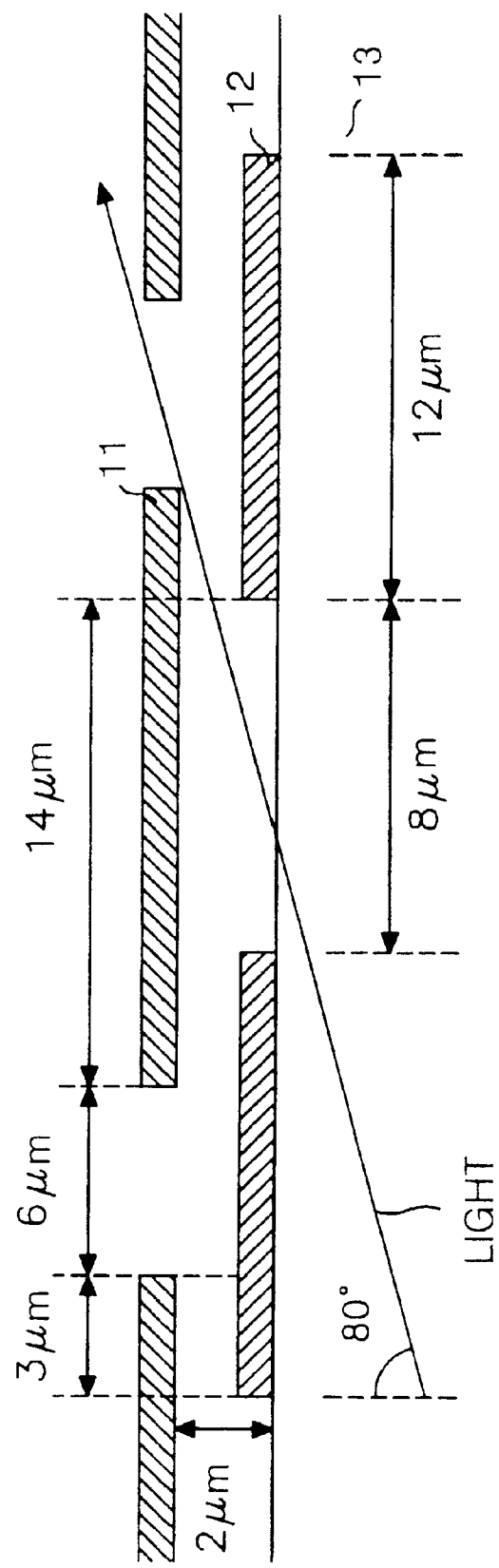
FIG. 27 is a sectional view of showing designed values of the fixed member and the moveable member and the path of lights as shown in FIG. 4.

If the width of the moveable member 11, the distance between the moveable members 11, the width of the fixed member 12, the distance between the fixed members 12, the width of the portion of the moveable member 11 overlapped with the fixed member 12 and the height from the substrate 13 to the moveable member 11 are 14 μm, 6 μm, 12 μm, 8 μm, 2 μm and 3 μm, respectively, as shown in FIG. 27. Also, light is incident to the rear surface of the substrate 13 in angle of 80° for a perpendicular plane of the substrate 13. In this case, a light of 40%=8 μm/20 μm the strenght of the incident light is passed through a gab between the fixed members 12. A light of above 70% the strenght of the incident light that passes through the gab between the fixed members 12, except that to lights that are somewhat cut off by the portion of the moveable member 11 overlapped with the fixed member 12 progress to the exterior via a gab between the moveable members 11. Accordingly, a total transmissivity of the micro light modulator is about 28%= 40%×70% of an amount of the incident. If a reflective film is formed on the rear surface of the fixed member 12 and a light-guide plate is used for re-reflecting the lights reflected by the reflective film toward the display surface, the transmissivity of the micro light modulator can be high up to about 50% and above. Also, the micro light modulator can be high up to about 50% and above in the transmissivity, by forcing the moveable member 11 to be overlapped with the fixed member 12 at below 3 μm.

Figure 28:
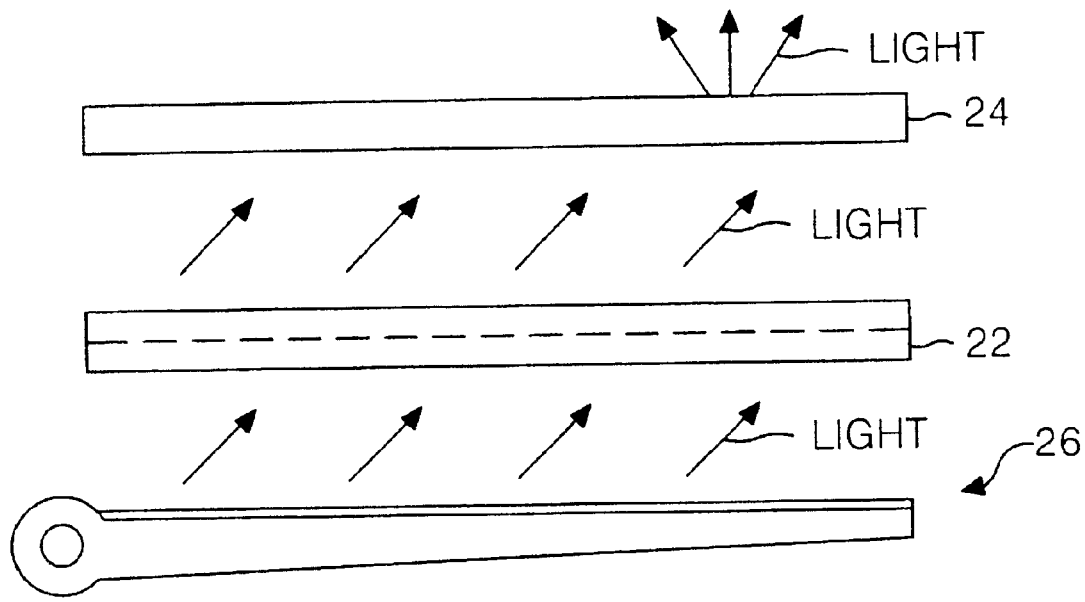
FIG. 28 is a sectional view of showing a display device using the micro light modulator of FIG. 4.

FIG. 28 illustrates a display device using the micro light modulator according to an embodiment of the present invention.

Referring to FIG. 28, the display device includes: a light valve panel 22 having picture elements each provided with moveable members 11 thereon; a back light unit 26; installed on the rear surface of the light valve panel 22; and a diffusing sheet 24 for diffusing or spreading lights from the light valve panel 26. The back light unit 24 has a light source and a light-guide plate. The light-guide plate 26 forces white lights generated in the light source to progress toward the incident plane of the light valve panel 22 in angle of 60°18 80°, thereby distributing uniformly the lights over the incident plane of the light valve panel 22. A prism sheet can be disposed on the rear surface of the diffusing sheet 24 to change a path of lights progressing slantingly from the light valve panel 22 perpendicular to the diffusing sheet 24.

The light valve panel 22 controls electrically the moveable members and fixed members in each the picture element to switch the lights, thereby displaying a picture corresponding to an input video data. Each moveable member moves within a short distance of about 2~3 μm. Accordingly, the light valve panel 22 has a responding speed of a unit of μsec. The light valve panel 22 further includes driving circuits for driving the moveable members 11 and the fixed members 12. A picture of gray scale can be displayed on the light valve panel 22 by a passive driving system. The passive driving system divides a predetermined period in accordance with a bright level scale of input video data and drives the moveable members 11 and the fixed members 12 during the divided period corresponding to the brightness value of the input video data. Also, the light valve panel 22 can display a picture of full colors by forming red, green and blue color filters in each the picture element.

On the other hand, the light valve panel 22 can display the picture of full colors without the color filters, by being driven in a color field sequential system. The color field sequential system controls red, green and blue lights from the back light unit 26 to be irradiated to the light valve panel 22. In this case, the light valve panel 22 has a light efficiency.

Figure 29:
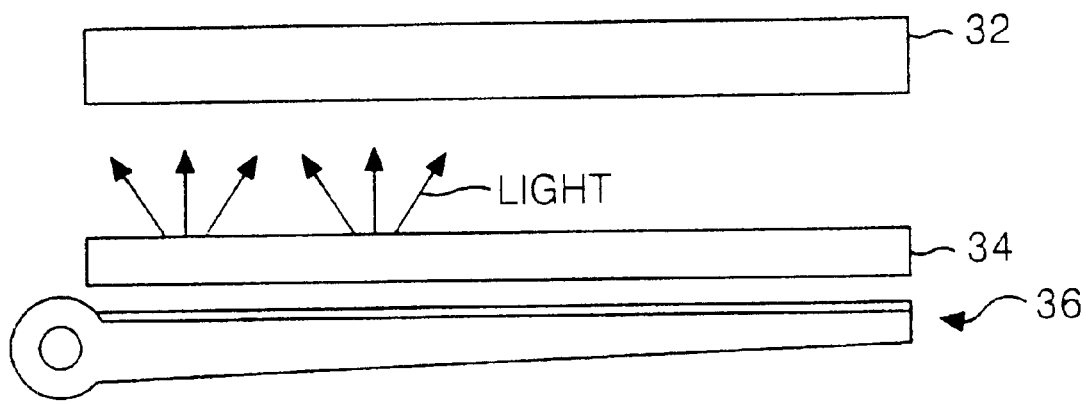
FIG. 29 is a sectional view of showing the conventional projective display apparatus.

The display device as described above will be compared with a projective liquid crystal display apparatus shown in FIG. 29.

Referring the FIG. 29, the projective liquid crystal display apparatus includes a liquid crystal panel 32, a back light unit 36 having a light source and a light-guide plate, and a diffusing sheet 34 between the liquid crystal panel 32 and the back light unit 36. The diffusing sheet 34 diffuses lights from the back light unit 36 and applies the diffused lights to the liquid crystal panel 32. The projective liquid crystal display apparatus can further includes a prism sheet, which is disposed on the diffusing sheet 34, for changing a progressing path of lights from the diffusing sheet 34 to the liquid crystal panel 32 into the perpendicular direction.

In comparison with the projective liquid crystal display apparatus of FIG. 29 and the display device of FIG. 28, the back light unit 26 and 36, the diffusing sheet 24 and 34 and the prism sheet are used for both of the projective liquid crystal display apparatus and the display device in the same. In other words, the display device can use some elements in common included in the projective liquid crystal display apparatus. Meanwhile, the light valve panel 22 is simple in structure relative to the liquid crystal panel 32. Also, the light valve panel is simple relative to the projective liquid crystal display apparatus, which requires semiconductor-manufacturing process for manufacturing thin film transistors, in the fabricating method.

Figure 30:
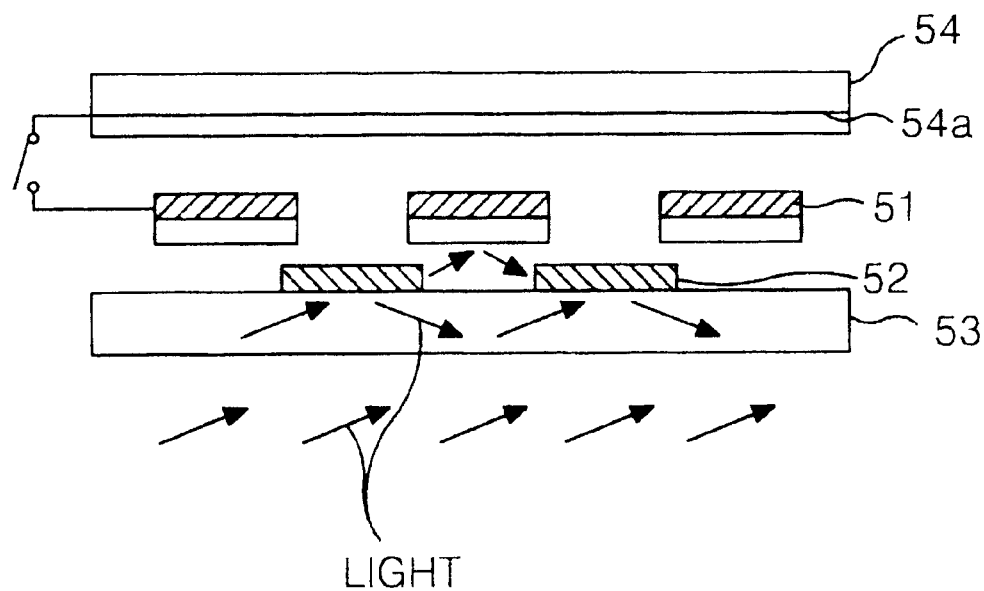
FIG. 30 is a sectional view of showing a micro light modulator according to a second embodiment of the present invention in a non-display mode.
Figure 31:
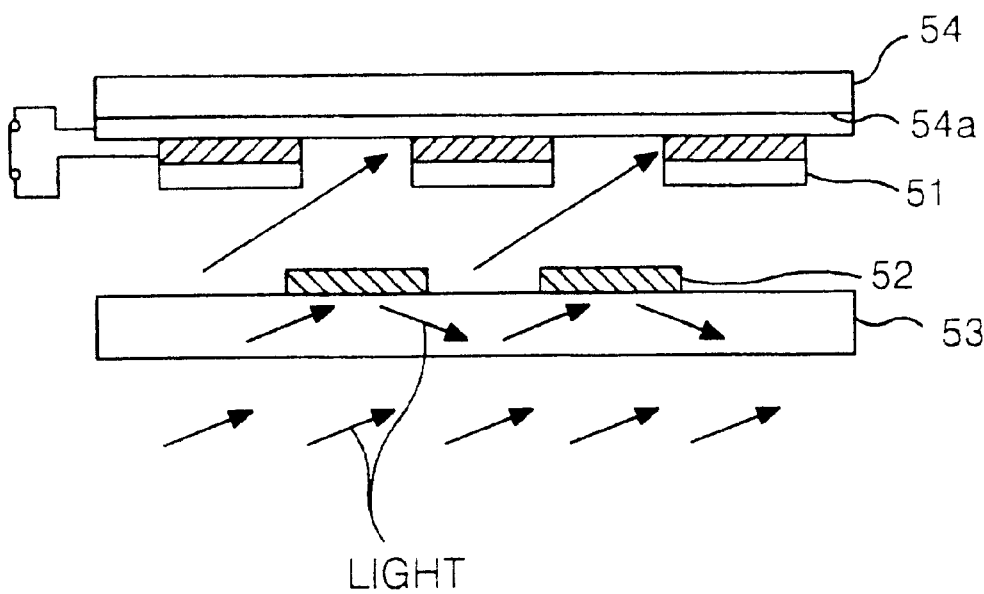
FIG. 31 is a sectional view of showing a micro light modulator according to a second embodiment of the present invention in a display mode.

FIGS. 30 and 31 illustrate a micro light modulator according to a second embodiment of the present invention. Referring to FIGS. 30 and 31, the micro light modulator includes a plurality of fixed members 52 formed in parallel to each other on a lower substrate 53 to be at a predetermined distance from each other, and a plurality of moveable members 51 responding to a static electric force generated by an electric field between an upper substrate 54 and the lower substrate 53 to switch a light path.

The fixed members 52 can be formed from a non-conductive material because a voltage is not applied to it. However, the fixed members 52 are preferably formed from a material which does not transmit and reflect lights from the exterior. The moveable members 51 are overlapped on both sides by the fixed members 52 and both end portions of each moveable member 51 are fixed on the lower substrate 53. Each moveable member 51 is formed in a double layer structure which has an elastic layer for increasing an elastic restoring force and an electrode layer for receiving a voltage. On the other hand, the moveable member 51 can be formed in a single layer structure having only an electrode layer of large elastic force. The upper substrate 54 has a transparent electrode 54A of ITO (Indium Tin Oxide) on the rear surface thereof. The transparent electrode 54A is formed to cover the entire rear surface of the upper substrate 54. Also, the transparent electrode 54A can be formed to have stripes. The light path is switched, whether a voltage is applied between the transparent electrode 54A of the upper substrate 54 and the moveable members 51.

Next, the operation of the micro light modulator according to the second embodiment of the present invention will be described.

In non-display mode, a voltage is not applied to the transparent electrode 54A of the upper substrate 54 and the moveable members 51, as shown in FIG. 30. At this time, the fixed members 52 and the moveable members 51 maintain a distance (or gab) between each other, which does not transmit lights from the rear surface of the lower substrate 53. For example, if incident light from the back light unit progresses at angle of 60°~80° toward the incident surface of the lower substrate 53 and the distance between the fixed members 52 and the moveable members 51 is 0.5~0.8 μm, the incident light is cut off by the fixed members 52 and the moveable members 51.

In display mode, a voltage is applied between the transparent electrode 54A of the upper substrate 54 and the moveable members 51, as shown in FIG. 31. The moveable members 51 move to the upper substrate 54 by a static electric force occurring between the transparent electrode 54A and it. Then, a light path is provided between the fixed member 52 and the moveable member 51. The lights from the back light unit (not shown) progress toward a display plane so as to display a picture.

The micro light modulator of FIG. 4 must maintain a distance (or gab) between the fixed member 12 and the moveable member 11, so the lights can be transmitted when the voltage is not applied between the fixed member 12 and the moveable member 11, which are separated by a distance of above 2 μm, for example, because of being driven in the normally white system. Meanwhile, the micro light modulator shown in FIGS. 30 and 31 allows the distance between the fixed member 52 and the moveable member 51 to be only about 0.5~0.8 μm when the voltage is not applied the transparent electrode 54A and the moveable member 51, because of being driven in a normally black system. Therefore, the micro light modulator shown in FIGS. 30 and 31 allows the sacrificial layer therein to be thinner than that shown in FIGS. 23 and 24.

Figure 32:
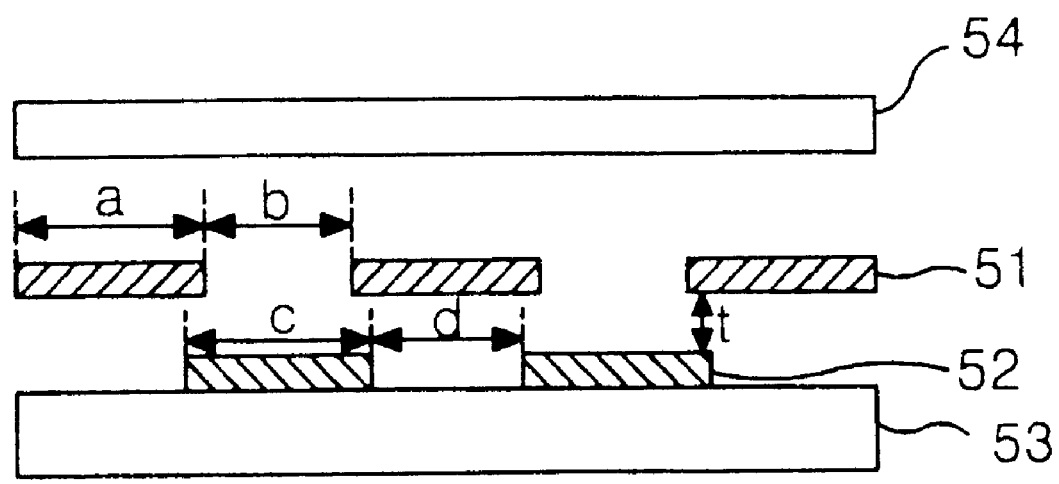
FIG. 32 is a sectional view of representing size of each element included in the micro light modulator shown in FIGS. 30 and 31, for a simulation of light transmissivity.
Figure 33:
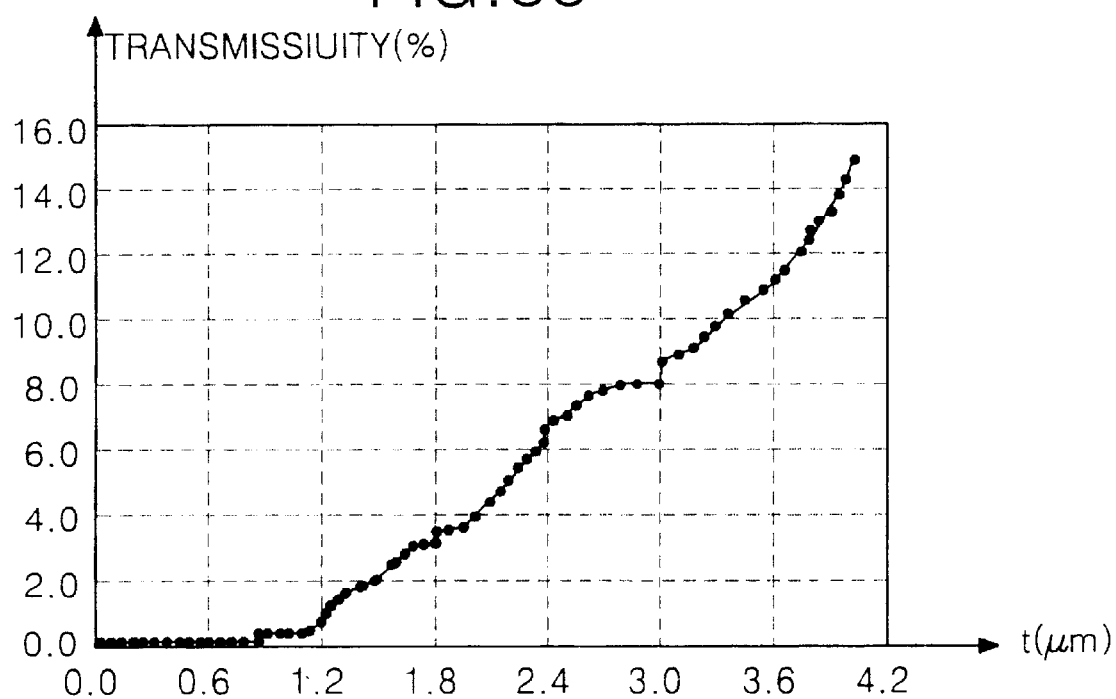
FIG. 33 is a graphic diagram of representing a light transmissivity of the micro light modulator shown in FIGS. 30 and 31, in accordance with the variation of distance between the moveable member and the fixed member.

FIG. 33 explains the transmissivity of the micro light modulator shown in FIGS. 30 and 31 when the voltage is applied between the transparent electrode 54A and the moveable members 41. In this case, the width a of each moveable member 51, the distance b between the moveable members 51, the width c of each the fixed member 52 and the distance d between the fixed members 52 are established in 12 μm, 8 μm, 12 μm and 8 μm, respectively, as shown in FIG. 32. Also, the micro light modulator of FIG. 32 uses a prior back light unit when lights becomes incident to the lower substrate 53 in angle of 60°. As seen in FIG. 33, we can know that transmissivity of the micro light modulator is higher as the distance t between the moveable member 51 and the fixed member 52 becomes larger. In detail, the moveable members 51 and the fixed members 52 cut off almost all the lights from the back light unit when the distance between the moveable member 51 and the fixed member 52 is within about 0.8 μm. Meanwhile, the transmissivity (%) of the micro light modulator becomes gradually high as the distance between the moveable member 51 and the fixed member 52 becomes larger than 0.8 μm.

Figure 1:
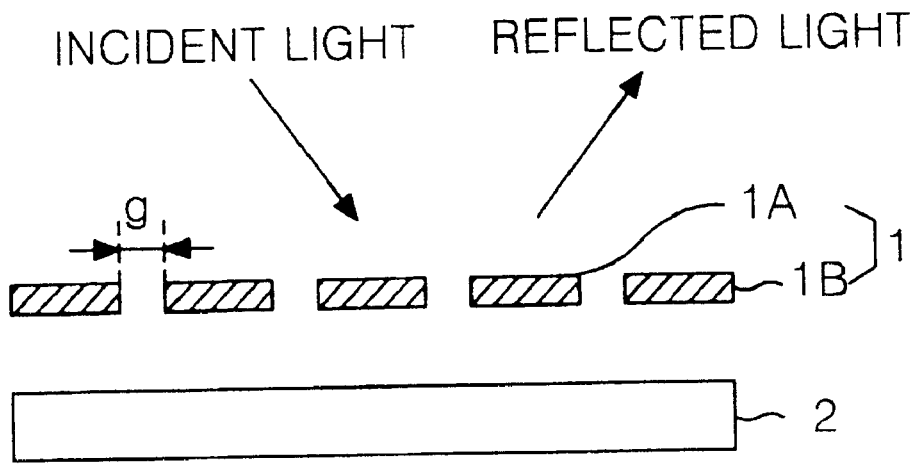
FIG. 1 is a sectional view of showing the conventional micro light modulator in a non-display mode.
Figure 2:
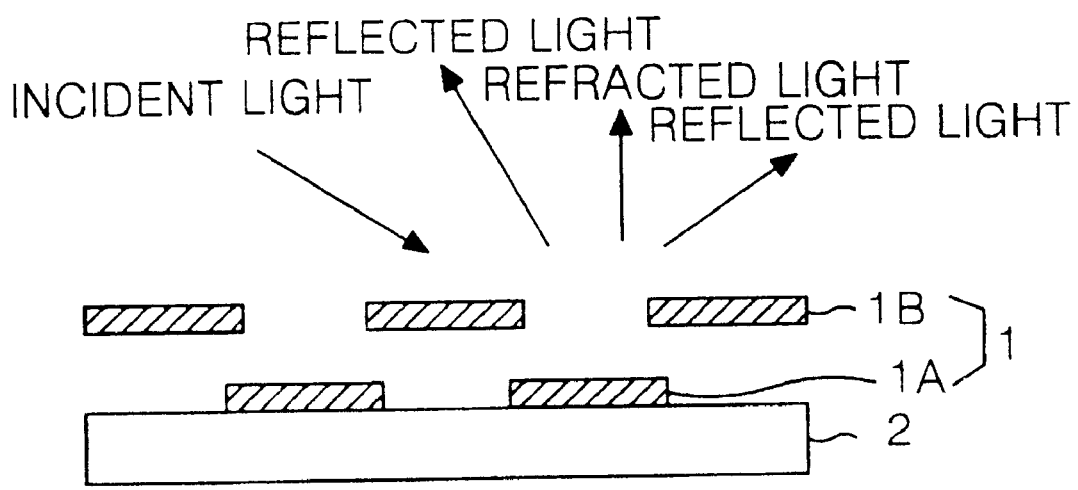
FIG. 2 is a sectional view of showing the conventional micro light modulator in a display mode.
Figure 3:
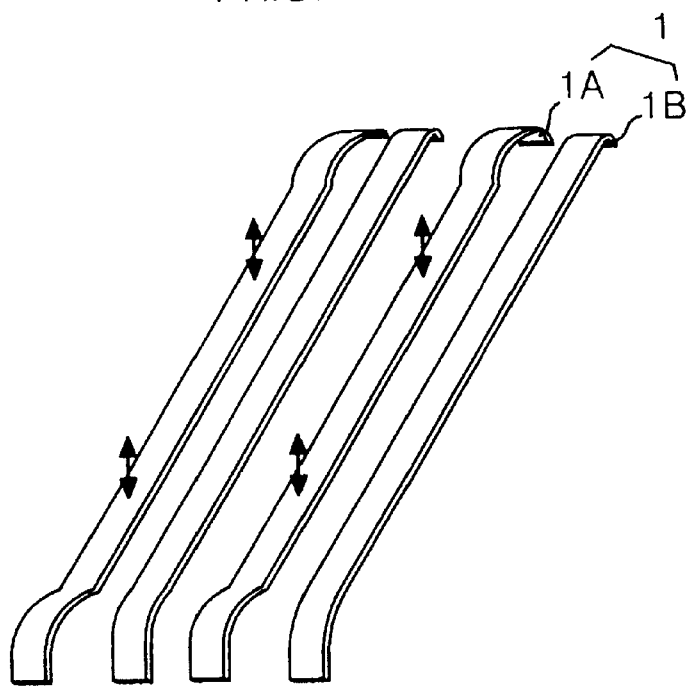
FIG. 3 is a detailed view of showing the ribbons in FIGS. 1 and 2.
Figure 34:
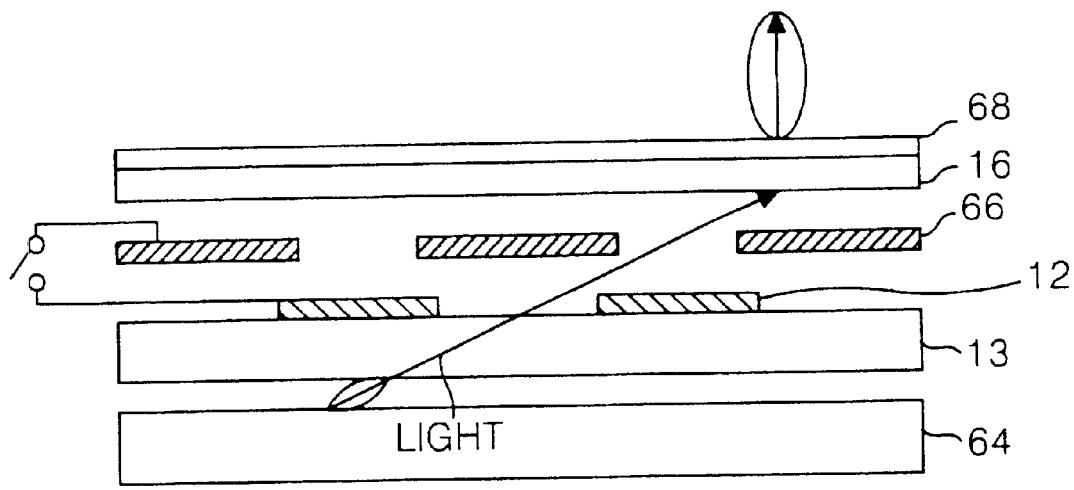
FIG. 34 is a sectional view of showing a display device using a micro light modulator according to a second embodiment of the present invention.
Figure 35:
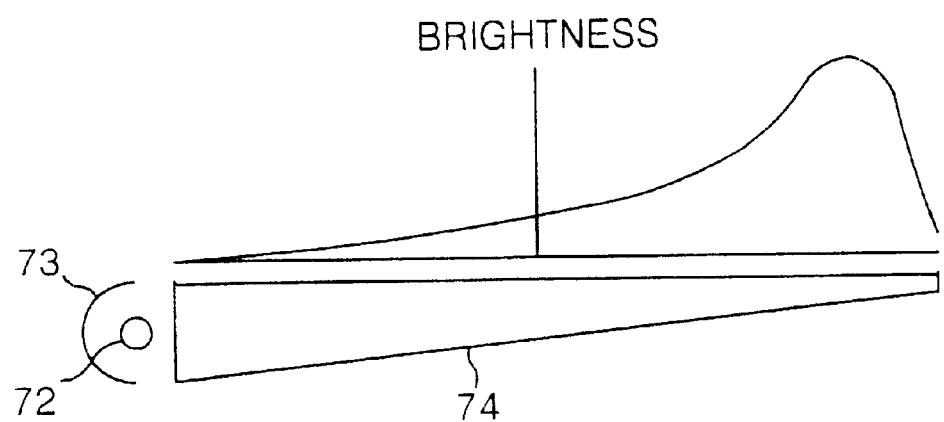
FIG. 35 is a sectional view of explaining a light distribution of the back light unit in FIG. 34.
Figure 36:
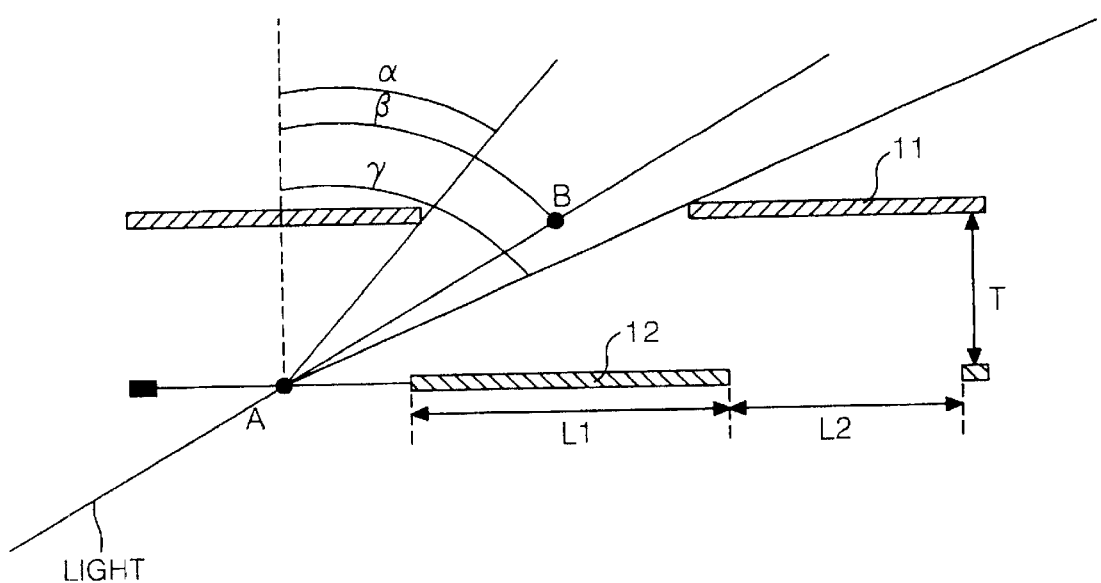
FIG. 36 is a sectional view of representing the lights progressing between the moveable member and the fixed member.

FIG. 34 shows a display device using a micro light modulator according to a second embodiment of the present invention. In FIG. 2, the display device includes: a rear substrate 13 having fixed members 13 and moveable members 11 formed thereon; a back light unit 64 for irradiating lights to the rear substrate 13; a front substrate 66 opposed to the rear substrate 13; and a light control sheet 68, disposed on the front substrate 66, for changing the lights passed between the moveable members 11 and the fixed members 13 in the perpendicular to the front substrate 66. The back light unit 64 includes a lamp 72, a reflective mirror 73 and a light-guide plate 74. The light-guide plate 74 leads lights generating from the lamp 72 to progress in inclination of angle of about 60°~80° for the incident plane of the rear substrate 13.

Most of all the lights output from the back light unit 64 must progress in a specific angle for the incident plane of the rear substrate 13 in order to obtain a maximum light efficiency. The inclined angle of lights for the incident plane of the rear substrate 13 is appropriately established based on the width of the moveable member 11, the distance between the moveable members 11, the width of the fixed member 12, the distance between the fixed members 12 and the distance between the moveable member 11 and the fixed member 12.

In other words, if the lights from the back light unit 64 are distributed in an angle of predetermined range with an inclined angle of line passing the center dots between the moveable members 11 and between the fixed members 12 as a center, the micro light modulator has a maximum light efficiency. If a width of the fixed member 12, a distance between the fixed members 12 and a height from the fixed member 12 to the moveable member 11 are L1, L2 and T, respectively, a center dot between the fixed members 12 is "A" and a center dot between the moveable members 11 is "B". An inclined angle a of light via dots A and B, an inclined angle β of light through the dot A and the end portion of a left moveable member 11 and an inclined angle γ of light passing the dot A and the end portion of the right moveable member 11, from the perpendicular line passing the dot A are obtained as the following equations 1 to 3.

$$\alpha = |\tan^{-1}(T/(L1/2)) - 90| \quad \text{(Eq. 1)}$$

$$\beta = |\tan^{-1}(T/((L1+L2)/2)) - 90| \quad \text{(Eq. 2)}$$

$$\gamma = |\tan^{-1}(T/(L1+L2)) - 90| \quad \text{(Eq. 3)}$$

As the width L1 of the fixed member 11, the distance L2 between the fixed members 12 and the height T from the fixed member 12 to the moveable member 11, which can be formed actually, L1=12 μm, L2=8 μm and T=3.3 μm can be applied to the Eqs. 1 to 3. In this case, the inclined angle of the lights from the back light unit 64 must be distributed in the range of about 61°~76° in order to obtain the maximum efficiency.

Figure 37:
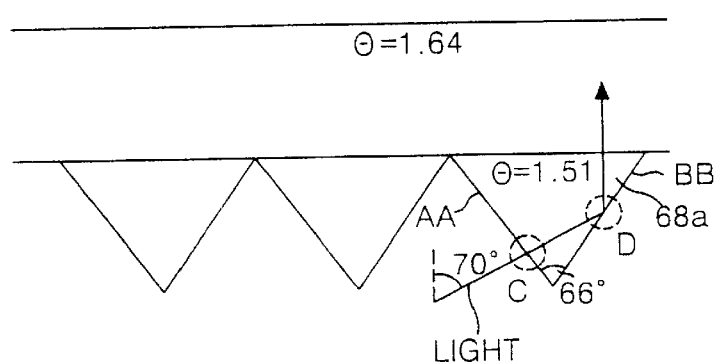
FIG. 37 is a sectional view of showing the prism pattern of the light control sheet shown in FIG. 34.
Figure 38A:
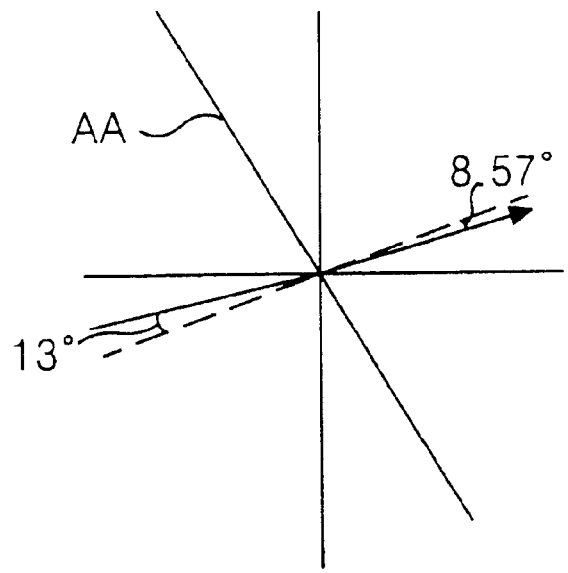
FIG. 38A is a view of representing a path of lights being incident to the incident plane of the prism pattern in FIG. 37.
Figure 38B:
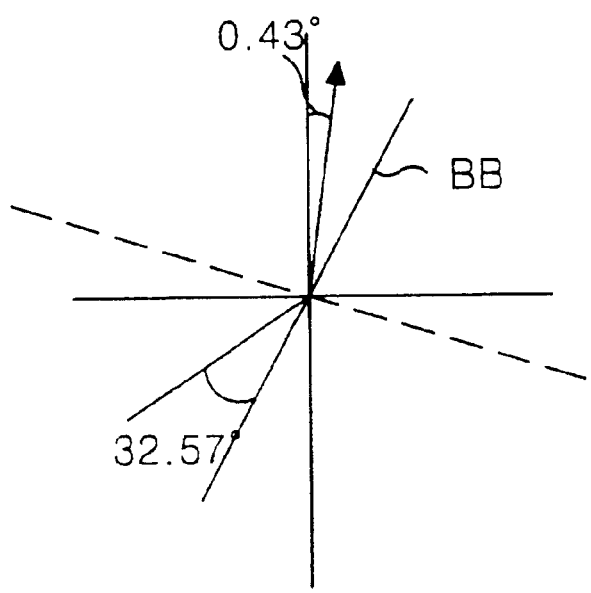
FIG. 38B is a view of representing a path of lights reflecting by the output plane of the prism pattern in FIG. 37 toward the display plane.

The light control sheet 68 refracts the lights from the back light unit 64 via the fixed members 12 and the moveable members 11 toward user, i.e., in direction perpendicular to the front substrate 66. To this end, the light control sheet 68 is formed from a material which is not back scattering the light incident to it toward the rear substrate 12. Such a material for the light control sheet can be any one of a hologram optical element using a diffraction, a material sheet of low refractive index and so on. Since the lights progressing along with the path between the fixed members 12 and moveable members 11 have the inclined angles α, β, and γ of above 60°, the light control sheet 68 has prisms 68A arranged continuously on its incident plane. Each prism 68A has a sectional view of tri-anglular shape and a vertical angle of below 90°, as shown in FIG. 37. In the light control sheet 68, a refractive index nbase of base material and a refractive index nprism of the prism 68A are established to about 1.51~1.58 and about 1.64, to reduce the back scattering. The light progressing to the light control sheet 68 in the inclined angle of 70° is incident to the incident plane of the prism 68A in the inclined angle of 13°. The light passed through the incident plane AA is refracted to progress in the inclined angle of 8.57°. Also, the light progressing into the medium of the prism 68A is reflected at the reflective plane BB toward the display plane at the inclined angle of 0.430 from the perpendicular line. The micro light modulator becomes high in the light efficiency, because the lights passed through the fixed members 12 and the moveable members 11 progresses toward the user.

Meanwhile, the prisms 68A on the rear surface of the light control sheet 68 have a disadvantage in that the user can view its pattern.

Figure 39:
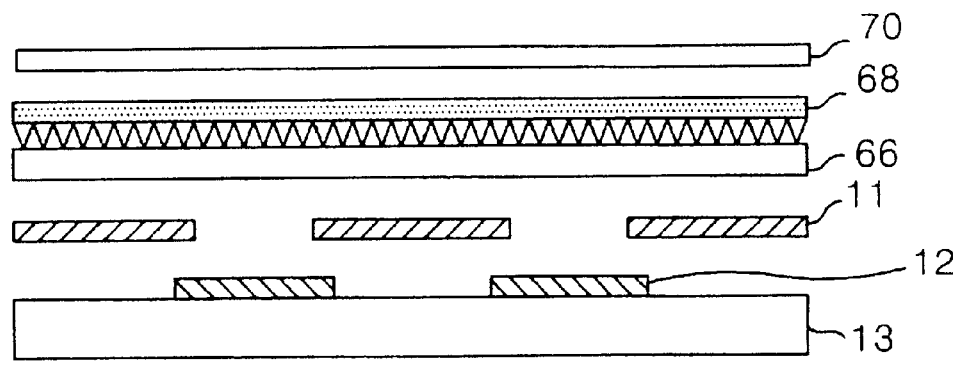
FIG. 39 is a sectional view of showing a display device using a micro light modulator according to a third embodiment of the present invention.

FIG. 39 illustrates a display device using the micro light modulator according to a third embodiment of the present invention. Referring to FIG. 39, the display device further includes a diffusing sheet 70 relative to that shown in FIG. 34. The diffusing sheet 70 is disposed on the light control sheet 68 to distribute the lights progressing toward the display plane. Since the lights to be irradiated to the display plane are distributed by the diffusing sheet 70, the display device provides with an advantage that the prism pattern on the rear surface of the light control sheet 68 can be represented at the eyes of the user. The locations of the front substrate 66, light control sheet 68 and diffusing sheet 70.

Figure 40:
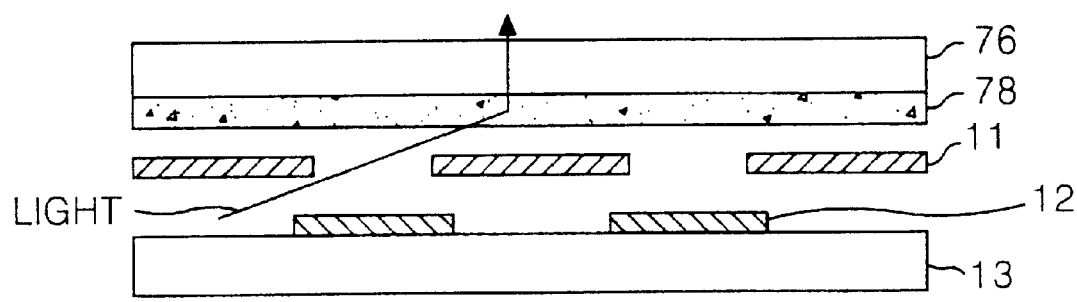
FIG. 40 is a sectional view of showing a display device using a micro light modulator according to a fourth embodiment of the present invention.

FIG. 40 shows a display device using the micro light modulator according to a fourth embodiment of the present invention. Referring to FIG. 40, the display device further includes a rear substrate 13 having moveable members 11 and fixed members 12 formed thereon, and a hologram light control sheet 78 disposed on a front substrate 66. The hologram light control sheet 78 functions to diffract the lights being incident along with a path between the fixed members 12 and the moveable members 11 in direction perpendicular to a display plane. The display device of FIG. 40 has an advantage in that the lights do not have back scattering because of using the diffraction by the hologram light control sheet 78. The gratings of the hologram light control sheet 78 are appropriately controlled in width and height in accordance with the inclined angle of the incident light.

In order to enhance the light efficiency, the display device can reduce the lights cut off by the fixed members 12.

Figure 41:
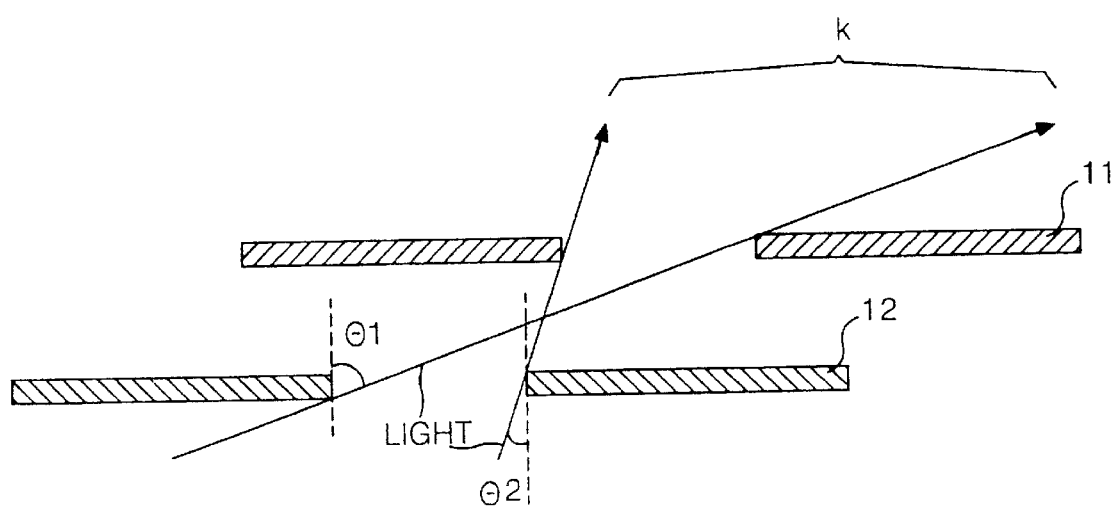
FIG. 41 is a sectional view of explaining paths of lights from the entire direction light source between the moveable member and the fixed member shown in FIG. 4.

Referring to FIG. 41, lights are incident to a path between the fixed members 12 and the moveable members 11 in the entire directions. Among the lights, the lights having an inclined angle within a range of about θ1~θ2 progress toward the display plane via the path between the fixed members 12 and the moveable members 11. Meanwhile, the lights having an inclined angle without the range of about θ1~θ2 are cut off by the fixed members 12 and the moveable members 11. The amount of lights "k" progressing via the fixed members 12 and the moveable members 11, i.e., the transmissivity, is varied along with the inclined angular distribution of main light components determining a maximum brightness values.

Figure 42:
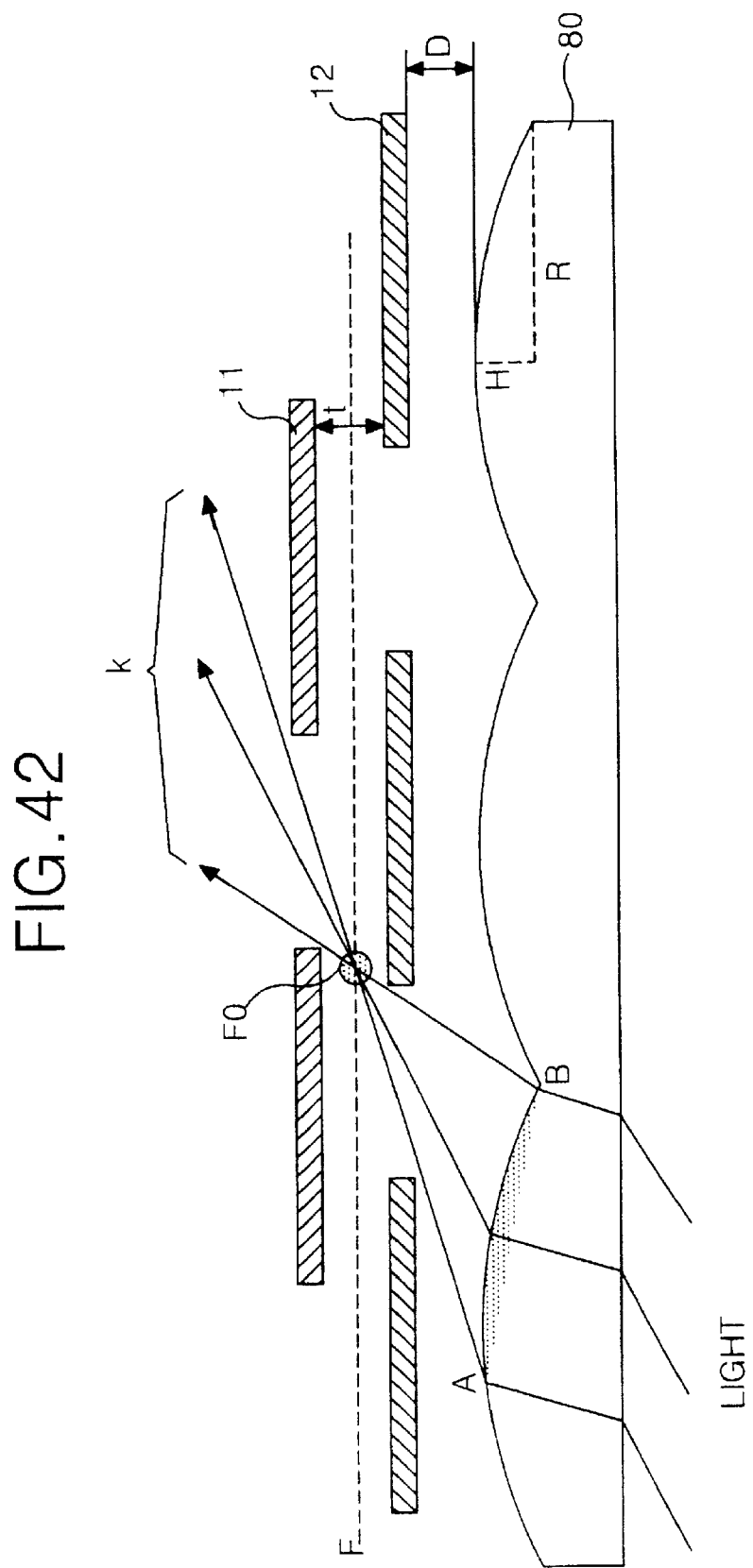
FIG. 42 is a sectional view of showing a micro light modulator according to a third embodiment of the present invention.

FIG. 42 shows a micro light modulator according to a third embodiment of the present invention. The micro light modulator of FIG. 42 includes a cylindrical lens array 80 disposed under fixed members 12 and moveable members 11. The cylindrical lens array 80 includes an incident plane being coplanar and an output plane having a plurality of curved surfaces arranged thereon. The curved surfaces each have a half-cylinder shape of predetermined pitch 2R. A focal point F0 of the cylindrical lens array 80 is position between the fixed member 12 and the moveable member 11. The lights passing through a part of the output plane of the cylindrical lens array 80, i.e., from A to B, are focused at the focal point F0 before being emitted from the focal point F0. The lights emitted from the focal point F0 are distributed into various progressing directions and pass between the moveable members 11. The lights passed via the part A–B of the output plane of the cylindrical lens array 80 progress toward a display plane without interference by the moveable members 11 and the fixed members 12 because of focusing before emitting.

The focal point F0 can be positioned by adjusting the pitch 2R and height H of unit cylindrical lens and the distance between the moveable member 11 and the fixed member 12. Wherein, the pitch 2R of the unit cylindrical lens must be equal to one period of the moveable members 11 and the fixed members 12 or smaller than one period of the moveable members 11 and the fixed members 12. Also, the relationship of the pitch 2R and height H of the unit cylindrical lens is preferable to establish in H<<R in order to enhance a light efficiency.

The micro light modulator having the cylindrical lens array 80 enhances at least 8% relative to that having the light source generating parallel lights inclined in a predetermined angle. As a simulation, the micro light modulator transmits the lights of 25.5% among the incident light when it receives the parallel lights from the light source without the cylindrical lens array 80. Meanwhile, the micro light modulator having the cylindrical lens array 80 transmits the lights of above 34% among the incident light by focusing before emitting the lights. Based on the simulation resultant, the widths of the moveable member 11 and the fixed member 12, the distances between the members 11 and 12, and the cylindrical lens array 80 are established in condition as Table 3.

TABLE 3

| Item a:b:c:d | Length 12 μm:8 μm:12 μm:8 μm |
|---|---|
| T | 2.5 μm |
| R | 10.0 μm |
| H | 1.0 μm |
| D | 2.0 μm |

Figure 43:
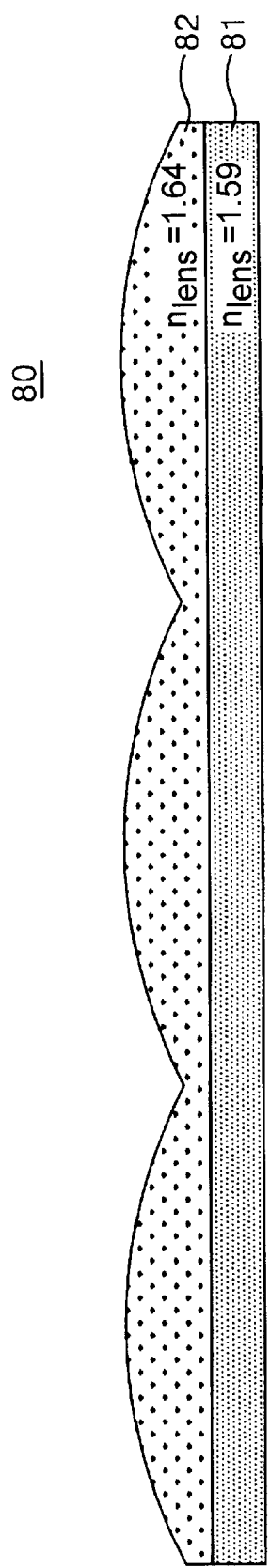
FIG. 43 is a detailed view of showing a structure of cylindrical lens array in FIG. 42.

In Table 3, "a", "b", "c", "d" and "t", respectively, are the width of the moveable member 11, the distance between the moveable members 11, the width of the fixed member 12, the distance between the fixed members 12 and the height from the fixed member 12 to the moveable member 11. Also, "R" is ½ of the pitch of the unit cylindrical lens and "D" is a distance between the cylindrical lens array 80 and the fixed member 12. Further, "H" is a height of the unit cylindrical lens. In the cylindrical lens array 80 used for the simulation, the refractive index of the lens layer 82 is established higher than that of the base portion 81 in order to reduce a back scattering of lights, as shown in FIG. 43. In FIG. 43, the refractive index n of the base portion 81 is 1.59 and the refractive index of the lens layer 82 is 1.64.

Figure 44:
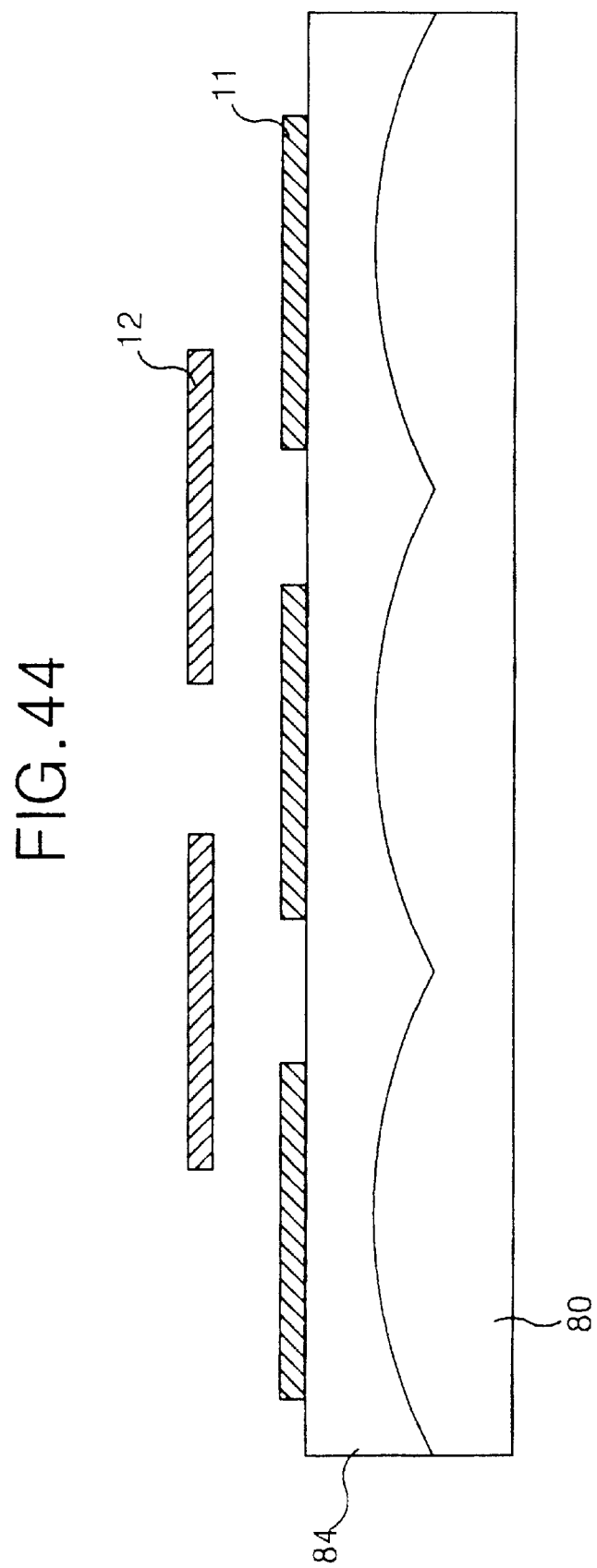
FIG. 44 is a sectional view of showing a micro light modulator according to a fourth embodiment of the present invention.

FIG. 44 illustrates a micro light modulator according to a fourth embodiment of the present invention. The micro light modulator further includes a resin layer 84 coated uniformly on a cylindrical lens array 80, relative to that shown in FIG. 34. The cylindrical lens array 80 is formed by etching a surface of glass substrate in a shape of cylindrically curved surface. The resin layer 84 is formed by coating uniformly a resin material on the surface of the cylindrical lens array 80. The resin layer 84 can prevent moving of fixed members 11 because of having the coplanar surface. The resin layer 84 allows a alignment to be accurate, thereby enhancing a light efficiency. Also, the refractive index of the resin layer 84 must be lower than that of the cylindrical lens array 80 in order to prevent a back scattering of lights. Wherein, the cylindrical lens array 80 and the resin layer 84 form one substrate 13.

Figure 45:
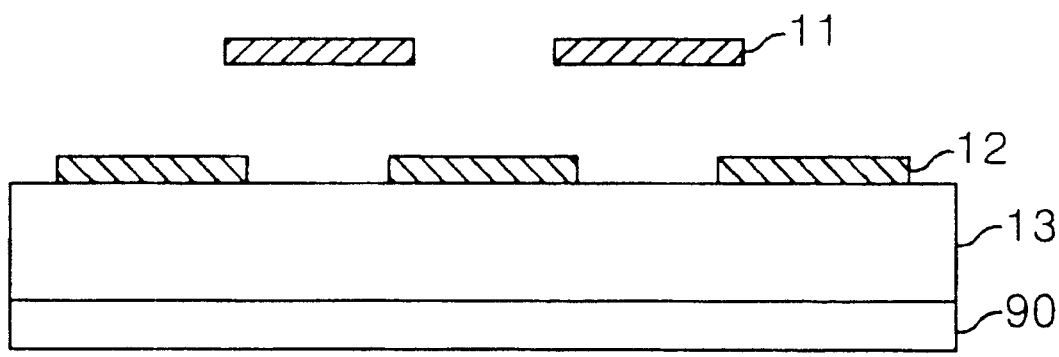
FIG. 45 is a sectional view of showing a micro light modulator according to a fifth embodiment of the present invention.

Furthermore, the micro light modulator have high incident light efficiency by reducing a leakage of lights reflecting from the rear surface of the substrate 13. To this end, the micro light modulator according to the fourth embodiment of the present invention further includes an optical medium 90 having a refractive index lower than that of the substrate 13, as shown in FIG. 45. The optical medium is installed on an incident plane (i.e., the rear surface) of the substrate 13. The optical medium 90 allows a difference of refractive index to represent at a boundary plane with the substrate 13 because of having the refractive index lower than that of the substrate 13.

Accordingly, most almost the lights passed via the optical medium 90 are transmitted to the substrate 13 so that the micro light modulator of FIG. 45 has a high incident light efficiency. If the refractive index of the substrate 13 is 1.5, the optical medium 90 has a refractive index of below 1.5. Also, the optical medium 90 is formed from a transparent material, for example, as an acrylic resin.

If the substrate 13 is a glass substrate having the refractive index of 1.5 and the incident light is inclined at an angle of 70°, the micro light modulator having the optical medium is compared with another micro light modulator without the optical medium, as the following Table 4.

TABLE 4

| Micro Light Modulator with optical medium | | | An amount of |
|---|---|---|---|
| Refractive index n of optical medium | Amount of Leakage lights % | Output angle of lights | Leakage without optical medium % |
| 1.45 | 29.83 | 69.36° | 30.97 |
| 1.4 | 29.36 | 69.70° | |
| 1.35 | 28.53 | | |
| 1.3 | 27.69 | | |
| 1.25 | 26.85 | | |
| 1.2 | 26.06 | | |

Figure 46:
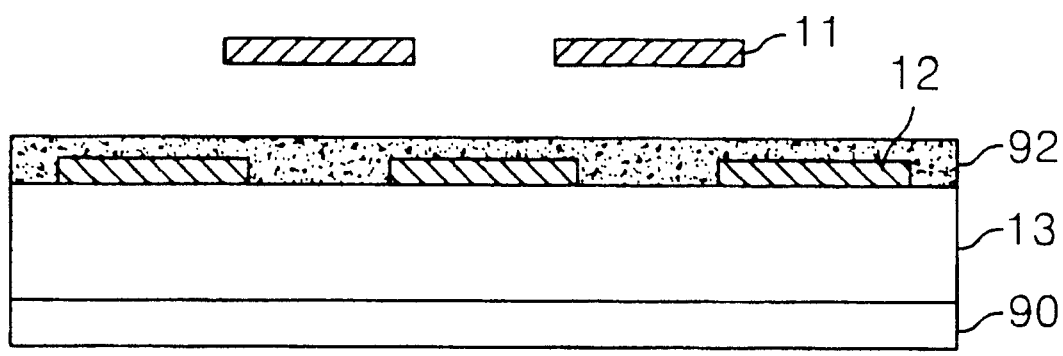
FIG. 46 is a sectional view of showing a micro light modulator according to a sixth embodiment of the present invention.

FIG. 46 shows a micro light modulator according to a fifth embodiment of the present invention. The micro light modulator of FIG. 46 further includes a transparent conductive film 92 formed on the substrate 13 to cover the fixed members 12 and an optical medium 90 formed on the rear surface of the substrate 13, relative to that shown in FIG. 6. In the fifth embodiment, the fixed members 12 are formed from a light absorbing material. The transparent conductive film 92 is disposed on the entire surface of the substrate 13 having the fixed members thereon, thereby having a low driving voltage. The transparent conductive film can be formed from an ITO (Indium Tin Oxide). The optical medium 90 can reduce the amount of reflection of incident light by having the refractive index lower than that of the substrate 13. If the refractive index of the substrate 13 is 1.5, the optical medium 90 has a refractive index of below 1.5. Also, the optical medium 90 is formed from a transparent material, for example, as an acrylic resin.

If the substrate 13 and the transparent conductive film 92 are a glass substrate having the refractive index of 1.5 and the ITO having the refractive index of 1.9 and the incident light is inclined in the angle of 70°, the micro light modulator having the optical medium 90 and the transparent conductive film 92 is compared with another micro light modulator only having the transparent conductive film without the optical medium, as the following Table 5.

TABLE 5

| When ITO film and optical medium are | | | An amount of Leakage when ITO film Is |
|---|---|---|---|
| Refractive index n of optical medium | Amount of Leakage lights % | Output Angle of lights | without optical Medium % |
| 1.45 | 35.56 | 69.33° | 36.29 |
| 1.4 | 34.81 | | |
| 1.35 | 34.04 | | |
| 1.3 | 33.26 | | |
| 1.25 | 32.49 | | |
| 1.2 | 31.76 | | |

As seen from Table 5, the incident light is leaked 17.1% at the rear surface of the substrate 13, 1.66% at the front surface of the substrate 13, and 21.6% at the output plane of the transparent conductive film 92 when the micro light modulator has only the transparent conductive film 92 without the optical medium 90. Consequently, the lights leaked at the boundary plane between the mediums corresponds to 36.29% of the amount of incident light when the micro light modulator does not have the optical medium 90. On the other hand, when the optical medium 90 having the refractive index lower than that of the substrate 13 is formed on the rear surface of the substrate 13, a leakage of lights being incident to the optical medium 90 is reduced. In this case, although the lights are leaded at the boundary plane between the substrate 13 and the transparent conductive film 92, a total leakage of lights in the micro light modulator becomes low.

Figure 47:
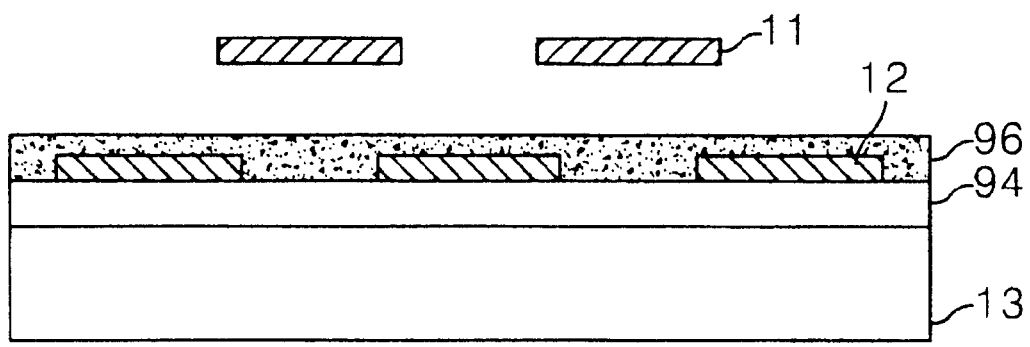
FIG. 47 is a sectional view of showing a micro light modulator according to a seventh embodiment of the present invention.

FIG. 47 illustrates a micro light modulator according to a sixth embodiment of the present invention. The micro light modulator of FIG. 47 further includes an optical medium 94 disposed between the substrate 13 and the fixed members 12 and a transparent conductive film 96 formed on the optical medium 94 to cover the fixed members 12, relative to that shown in FIG. 6. The transparent conductive film 96 covers the fixed members formed from a light absorbing material, thereby being low a driving voltage. The optical medium 94 has the differences of the refractive index at the boundary planes with the substrate 13 and the transparent conductive film 96 by having a value lower than the refractive indexes of the substrate 13 and the transparent conductive film 96. The optical medium 94 reduces a leakage of lights reflected by the incident plane of the transparent conductive film 96 to enhance an efficiency of incident light. The optical medium 94 has a value of refractive index between the refractive indexes of the substrate 13 and the transparent conductive film 96. For example, if the substrate 13 and the transparent conductive film 96 are a glass substrate having the refractive index of 1.5 and an ITO having the refractive index of 1.9, respectively, the optical medium 94 is formed from a transparent material having a refractive index within 1.5 to 1.9.

If the substrate 13 and the transparent conductive film 96 are a glass substrate having the refractive index of 1.5 and the ITO having the refractive index of 1.9 and the incident light is inclined in the angle of 70°, the micro light modulator having the optical medium 94 and the transparent conductive film 96 is compared with another micro light modulator only having the transparent conductive film 96 without the optical medium, as the following Table 6.

TABLE 6

| When ITO film and optical medium are | | | An amount of Leakage when ITO film Is |
|---|---|---|---|
| Refractive index n of optical medium | Amount of Leakage lights % | Output Angle of lights | without optical Medium % |
| 1.85 | 36.08 | 69.33° | 36.29 |
| 1.8 | 35.92 | | |
| 1.75 | 35.81 | | |
| 1.7 | 35.76 | | |
| 1.65 | 35.77 | | |
| 1.6 | 35.85 | | |

Figure 48:
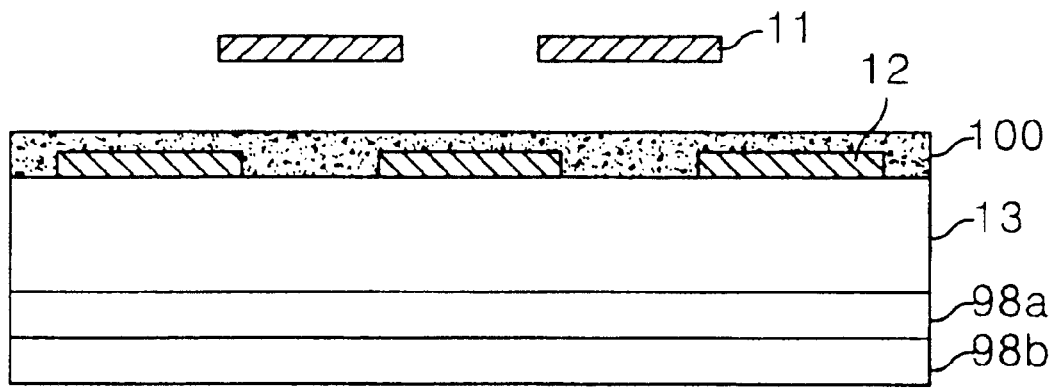
FIG. 48 is a sectional view of showing a micro light modulator according to an eighth embodiment of the present invention.

FIG. 48 illustrates a micro light modulator according to a seventh embodiment of the present invention. The micro light modulator of FIG. 48 further includes a first and second optical mediums 98A and 98B disposed sequentially on the rear surface of the substrate 13 and a transparent conductive film 100 formed on the substrate 13 to cover the fixed members 12, relative to that shown in FIG. 6.

The transparent conductive film 100 is formed on the entire surface of the substrate 13 having the fixed members 12 thereon, thereby being low a driving voltage. The first and second optical mediums 98A and 98A each have the refractive index lower than that of the substrate 13 to reduce leakage of lights reflected by the substrate 13. The first and second optical mediums 98A and 98B have a value of refractive index equal to each other. The micro light modulator having the first and second optical mediums 98A and 98B disposed sequentially can further reduce leakage of light relative to another micro light modulator having only one optical medium.

Actually, the incident light is leaded only below 31.59% when the refractive indexes of the substrate 13 and the transparent conductive film 100 are 1.5 and 1.9, respectively, the first and second optical medium is below 1.5, and the incident light is inclined at the angle of 70°.

Figure 49:
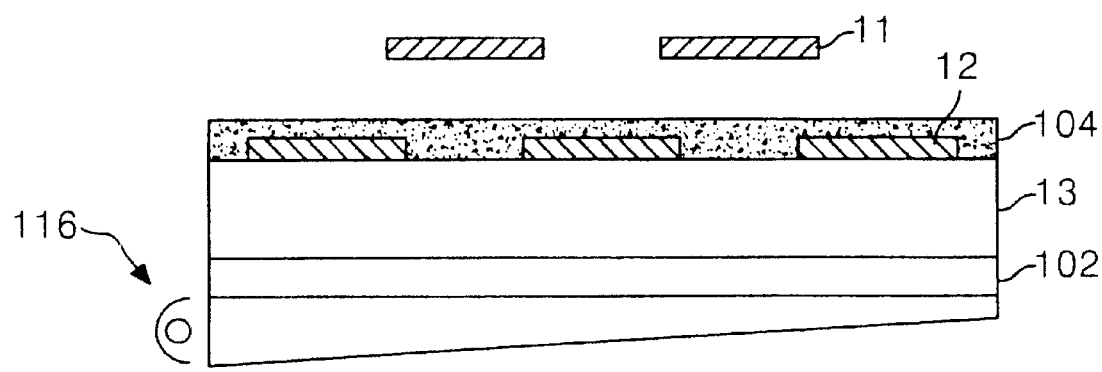
FIG. 49 is a sectional view of showing a display device using a micro light modulator according to a fifth embodiment of the present invention.

FIG. 49 shows a display device using a micro light modulator according to a fifth embodiment of the present invention. The display device of FIG. 49 includes a transparent conductive film 104 formed on a substrate 13 to cover a plurality of fixed members 12, a plurality of moveable members 11 on the transparent conductive film 104 to be placed by a predetermined distance, and an optical medium 102 between the substrate 13 and a back light unit 116. The transparent conductive film 104 allows a driving voltage to be low. The optical medium 102 adheres closely to the substrate 13 and a light guide plate of the back light unit 116 to eliminate an air layer. The optical medium 102 has a refractive index equal to that of the substrate 13 and the light guide plate of the back light unit 116 or similar to that of the substrate 13 and the light guide plate of the back light unit 116. If the substrate 13 and the light guide plate have the refractive index of 1.5, the optical medium 102 is formed from a transparent material having the refractive index of 1.5. The optical medium 102 allows lights from the light guide plate of the back light unit 116 to transmitted toward the substrate 13 without reflecting by the substrate 13, thereby reducing leakage of lights.

Figure 50:
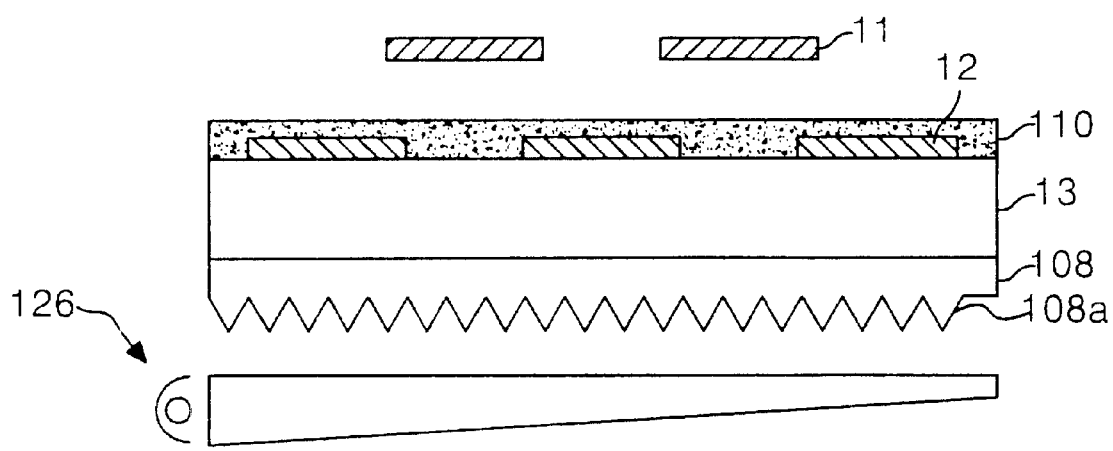
FIG. 50 is a sectional view of showing a display device using a micro light modulator according to a sixth embodiment of the present invention.

FIG. 50 illustrates a display device using a micro light modulator according to a sixth embodiment of the present invention. The display device of FIG. 50 includes a transparent conductive film 110 formed on a substrate 13 to cover a plurality of fixed members 12, a plurality of moveable members 11 on the transparent conductive film 110 to be placed by a predetermined distance, and an optical medium 108 between the substrate 13 and a back light unit 126. The transparent conductive film 110 allows a driving voltage to be low. The optical medium 102 has a prism pattern 108A formed on its incident plane (i.e., its rear surface). The prism pattern 108A includes a plurality of triangular prisms arranged on the rear surface of the optical medium 108. The optical medium 108 has a refractive index equal to that of the substrate 13 and the light guide plate of the back light unit 126 or similar to that of the substrate 13 and the light guide plate of the back light unit 126. If the substrate 13 and the light guide plate of the back light unit 126 have the refractive index of 1.5, the optical medium 102 is formed from a transparent material having the refractive index of 1.5. The prism pattern 108A of the optical medium 108 allows lights from the light guide plate of the back light unit 126 to transmit toward the substrate 13 without reflecting by the substrate 13. Also, the prism pattern 108A forces the lights from the light guide plate of the back light unit 126 to be refracted in direction perpendicular to the substrate 13.

As described above, the display device using a micro light modulator according to the present invention switches the lights from the back light unit to display a picture. Therefore, the display device of the present invention can be applied to various display apparatus such as a rear projective display apparatus, a directly projective display apparatus and so on.

The display device using a micro light modulator according to the present invention provides with a light switching member in the picture element using a MEMS and controls electrically the light switching member, thereby enhancing a responding speed in the unit of $\mu$sec. As a result, the display device of the present invention can display a moving picture.

The display device using a micro light modulator according to the present invention has a large margin in designing, as the moveable member and the fixed member are overlapped to each other. Also, the display device using a micro light modulator according to the present invention allows the fabricating method to be simple. Accordingly, the display device using a micro light modulator according to the present invention can provide with a large screen.

The display device using a micro light modulator according to the present invention adjusts the distance between the moveable members and the distance between the moveable member and the fixed member and controls the light efficiency. The display device using a micro light modulator according to the present invention sets up the inclined angle of incident light in an optimum angle. The display device using a micro light modulator according to the present invention establishes the vertical angle of the prism at below 90°. Accordingly, the display device using a micro light modulator according to the present invention enhances the light efficiency. The prism can be substituted with the hologram element for diffracting the lights to change the path of lights toward a viewer.

The display device using a micro light modulator according to the present invention can use the entire direction light source, which generates the lights in the entire directions, instead of the parallel light source for generating in parallel the lights at an inclined angle, in order to enhance the light efficiency. The entire direction light source can be implemented by a cylindrical lens array for transforming the parallel lights into the lights progressing in the entire directions. In order to enhance the light efficiency, the display device using a micro light modulator according to the present invention can include an optical medium, which is formed on the substrate, having the refractive index lower than that of the substrate to reduce leakage of incident light. In this case, the optical medium allows the differences between the refractive indexes to represent on the boundary planes between the mediums. Also, the optical medium can have a prism pattern on its incident plane. The prism pattern forces the incident light to progress in a direction perpendicular to the substrate.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A display device using a micro light modulator, comprising:
    a plurality of fixed members installed parallel to each other over a substrate, the fixed members being apart from each other;
    a plurality of moveable members being driven with the fixed members by a statically electric force to switch a path of lights incident from the substrate;
    a back light unit installed opposite to an incident plane of the substrate to irradiate lights at a predetermined angle for the incident plane of the substrate; and
    a diffusing sheet, opposite to an output plane of the substrate, for diffusing the lights being incident thereto.

2. The display device as claimed in claim 1, wherein the fixed members and the moveable members are formed from any one of a conductive material and a non-conductive material having an electrode, respectively.

3. The display device as claimed in claim 1, wherein the fixed members and the moveable members are arranged in each picture element.

4. The display device as claimed in claim 3, the moveable members switch sequentially each of red, green and blue lights from a light source.

5. The display device as claimed in claim 1, a width of the moveable member, a distance between the moveable member and fixed member and a distance between the moveable members are adjusted in order to control a light tranmissivity.

6. The display device as claimed in claim 5, wherein the moveable member and the fixed member are formed without overlapping to each other.

7. The display device as claimed in claim 1, wherein the moveable members overlap the fixed members.

8. The display device as claimed in claim 1, wherein the fixed members have a low transmissivity and a low reflective index for lights from the exterior.

9. A display device using a micro light modulator, comprising:
- a plurality of fixed members installed parallel to each other over a substrate, the fixed members being apart from each other;
- a plurality of moveable members being driven with the fixed members by a statically electric force to switch a path of lights incident from the substrate;
- a back light unit installed opposite to an incident plane of the substrate to irradiate lights at a predetermined angle for the incident plane of the substrate, said back light unit irradiating the lights toward the substrate at angles of about 62°~76° inclined from an axis perpendicular to the substrate; and
- a diffusing sheet, opposite to an output plane of the substrate, for diffusing the lights being incident thereto.

10. A display device using a micro light modulator, comprising:
- a plurality of fixed members installed parallel to each other over a substrate, the fixed members being apart from each other;
- a plurality of moveable members being driven with the fixed members by a statically electric force to switch a path of lights incident from the substrate;
- a back light unit installed opposite to an incident plane of the substrate to irradiate lights at a predetermined angle for the incident plane of the substrate;
- a light control sheet for refracting the lights passed in inclination between the moveable members and the fixed members at a direction perpendicular to a display plane; and
- a diffusing sheet, opposite to an output plane of the substrate, for distributing the lights from the light control sheet.

11. The display device as claimed in claim 10, wherein the light control sheet has a prism pattern formed on its incident plane, the prism pattern including a plurality of prisms each having a section view of triangular shape.

12. The display device as claimed in claim 11, wherein each prism is below 90° in vertical angle.

13. The display device as claimed in claim 10, wherein the light control sheet is a hologram light element.

14. A display device, comprising:
- a plurality of fixed members installed parallel to each other over a substrate, the fixed members being apart from each other;
- a plurality of moveable members being driven with the fixed members by a statically electric force to switch a path of lights incident from the substrate;
- a back light unit installed opposite to an incident plane of the substrate to irradiate lights at a predetermined angle for the incident plane of the substrate; and
- a diffusing sheet, opposite to an output plane of the substrate, for diffusing the lights being incident thereto, wherein:
  - a width of said plurality of moveable members, a distance between said plurality of moveable members and said plurality of fixed members, and a distance separating ones of said plurality of moveable members are adjusted in order to control light transmissivity, and
  - the distance between the moveable members and the fixed members is about 0.07~45.0 relative to the distance between the moveable members.

15. A display device using a micro light modulator, comprising:
- a plurality of fixed members installed parallel to each other over a substrate, the fixed members being apart from each other;
- a plurality of moveable members being driven with the fixed members by a statically electric force to switch a path of lights incident from the substrate;
- a back light unit installed opposite to an incident plane of the substrate to irradiate lights at a predetermined angle for the incident plane of the substrate;
- a diffusing sheet, opposite to an output plane of the substrate, for diffusing the lights being incident thereto, and
- an entire direction light source for generating the lights progressing in directions different from each other.

16. The display device as claimed in claim 15, the entire direction light source is a cylindrical lens array having a focal point between the fixed member and the moveable member, the cylindrical lens array transforming parallel lights into lights progressing at entire directions.

17. The display device as claimed in claim 16, wherein the cylindrical lens array is installed between the back light unit and the substrate.

18. The display device as claimed in claim 16, further comprising a resin layer formed from a material having a refractive index higher than that of the cylindrical lens array, the resin layer being disposed on an output plane of the cylindrical lens array to have a coplanar surface.

19. A display device using a micro light modulator, comprising:
- a plurality of fixed members installed parallel to each other over a substrate, the fixed members being apart from each other;
- a plurality of moveable members being driven with the fixed members by a statically electric force to switch a path of lights incident from the substrate;
- a back light unit installed opposite to an incident plane of the substrate to irradiate lights at a predetermined angle for the incident plane of the substrate;
- a diffusing sheet, opposite to an output plane of the substrate, for diffusing the lights being incident thereto, and
- an optical medium, on an incident plane of the substrate, having a refractive index different from that of the substrate.

20. The display device as claimed in claim 19, wherein the optical medium has the refractive index lower than that of the substrate.

21. The display device as claimed in claim 20, wherein the optical medium is below 1.5 in the refractive index.

22. The display device as claimed in claim 19, wherein the optical medium is formed on an incident plane of the substrate in a shape of double layers.

23. The display device as claimed in claim 19, further comprising a transparent conductive film formed on the entire surface of the substrate to cover the fixed members.

24. The display device as claimed in claim 23, wherein the optical medium is formed between the transparent conductive film and the substrate and has the refractive index lower than the refractive indexes of the substrate and the transparent conductive film.

25. The display device as claimed in claim 19, wherein the optical medium is installed between the substrate and the back light unit and adhered closely to them.

26. The display device as claimed in claim 25, wherein the optical medium is equal to the substrate and a light guide plate of the back light unit in the refractive index.

27. The display device as claimed in claim 19, wherein the optical medium is formed on an incident plane of the substrate and opposed to a light guide plate of the back light unit to provide with an air gap between its incident plane and the light guide plate.

28. The display device as claimed in claim 19, wherein the optical medium includes a prism pattern for refracting the lights from the back light unit to progress perpendicularly toward the substrate.

29. A method for fabricating a display device using a micro light modulator, comprising the steps of:
   forming a conductive material on a substrate;
   forming fixed members by patterning the conductive material;
   forming a sacrificial layer on the entire surface of the substrate to cover the fixed members;
   disposing sequentially an elastic layer and the conductive material, the elastic layer having a highly elastic-restoring force;
   forming a moveable member by patterning the elastic layer and the conductive material on the sacrificial layer, the moveable member being overlapped with both edges of the fixed member; and
   removing the sacrificial layer.

30. The method as claimed in claim 29, wherein the substrate is any one of a silicon substrate and a glass substrate.

31. The method as claimed in claim 29, further comprising the step of forming a protecting film on the entire surface of the substrate, the protecting film preventing the substrate from a damage at the removing of the sacrificial layer.

32. The method as claimed in claim 31, wherein the protecting film is formed from a light hardening resin.

33. The method as claimed in claim 29, wherein the elastic layer and the conductive material are simultaneously removed through an etching process.

34. The method of claimed in claim 29, wherein the elastic layer, the conductive material and the sacrificial layer are simultaneously removed through an etching process.

35. The method as claimed in claim 29, wherein the sacrifitial layer is formed from any one among $SiO_2$, a photoresist, a SOG, a polyimide, a PSG and a BPSG.

36. A display device using a micro light modulator, comprising:
   a plurality of fixed members installed parallel to each other over a substrate, the fixed members being apart from each other; and
   a plurality of moveable members being driven with the fixed members by a statically electric force to switch off a path of lights incident from the substrate by physically contacting the fixed members.

* * * * *